United States Patent
Inoue et al.

(10) Patent No.: US 8,042,503 B2
(45) Date of Patent: Oct. 25, 2011

(54) VARIABLE VALVE TIMING APPARATUS

(75) Inventors: Yasumichi Inoue, Toyota (JP);
Zenichiro Mashiki, Nisshin (JP);
Mitsuhiro Nomura, Toyota (JP);
Haruyuki Urushihata, Chiryu (JP)

(73) Assignees: Toyota Jidosha Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 263 days.

(21) Appl. No.: 12/282,720

(22) PCT Filed: Feb. 21, 2007

(86) PCT No.: PCT/JP2007/053712
§ 371 (c)(1),
(2), (4) Date: Sep. 12, 2008

(87) PCT Pub. No.: WO2007/113953
PCT Pub. Date: Oct. 11, 2007

(65) Prior Publication Data
US 2009/0071425 A1 Mar. 19, 2009

(30) Foreign Application Priority Data
Mar. 30, 2006 (JP) ................................. 2006-094881

(51) Int. Cl.
*F01L 1/34* (2006.01)
(52) U.S. Cl. ................ 123/90.17; 123/90.15; 123/90.31
(58) Field of Classification Search ............... 123/90.15, 123/90.17, 90.31
See application file for complete search history.

(56) References Cited

U.S. PATENT DOCUMENTS

| 6,883,476 | B1 | 4/2005 | Nohara et al. |
| 2002/0056424 | A1 | 5/2002 | Muraki |
| 2005/0022762 | A1 | 2/2005 | Machida |
| 2005/0235933 | A1 | 10/2005 | Arai et al. |
| 2007/0169729 | A1 | 7/2007 | Mashiki et al. |

FOREIGN PATENT DOCUMENTS

| EP | 1 201 886 A1 | 5/2002 |
| EP | 1 653 065 A2 | 5/2006 |
| JP | 2002-130038 A | 5/2002 |
| JP | 2002-138864 A | 5/2002 |
| JP | 2003-172160 A | 6/2003 |
| JP | 2004-116301 A | 4/2004 |
| JP | 2004-156461 A | 6/2004 |
| JP | 2004-340013 A | 12/2004 |
| JP | 2005-016427 A | 1/2005 |
| JP | 2005-307935 A | 11/2005 |

OTHER PUBLICATIONS

Japanese Office Action for corresponding Application No. 2006-094881, dated Jun. 21, 2011.

*Primary Examiner* — Zelalem Eshete
(74) *Attorney, Agent, or Firm* — Sughrue Mion, PLLC

(57) ABSTRACT

In a variable valve timing apparatus having a VVT mechanism in each of a plurality of banks, start of a valve timing control is not permitted until reference position learning of valve timing is completed in the corresponding bank and in other banks. Accordingly, the plurality of banks come to have matching valve timing setting at the time of valve timing control, whereby variation in the amount of air introduced to cylinders can be suppressed, and satisfactory combustion characteristics can be maintained.

13 Claims, 15 Drawing Sheets

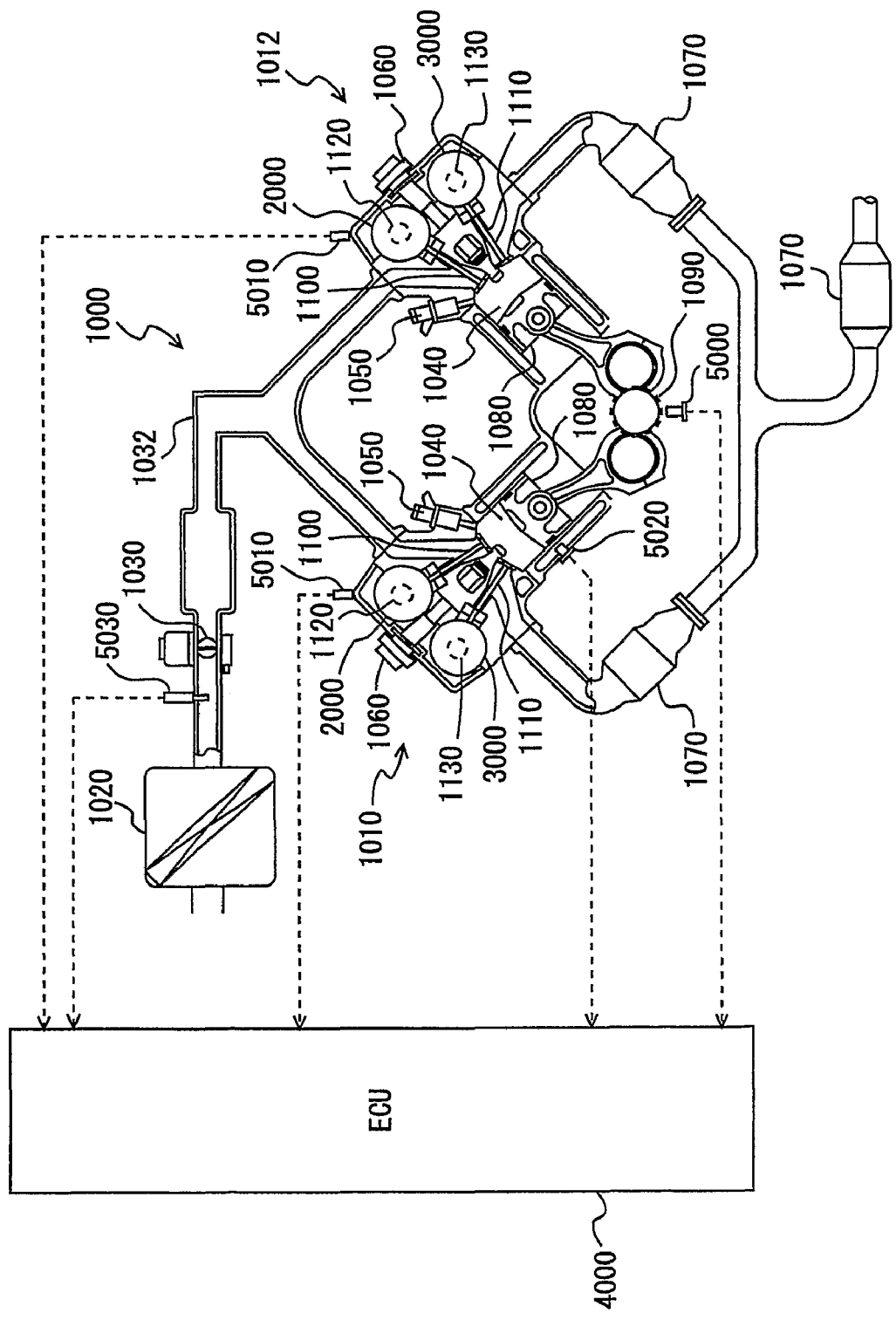
F I G. 1

F I G. 4
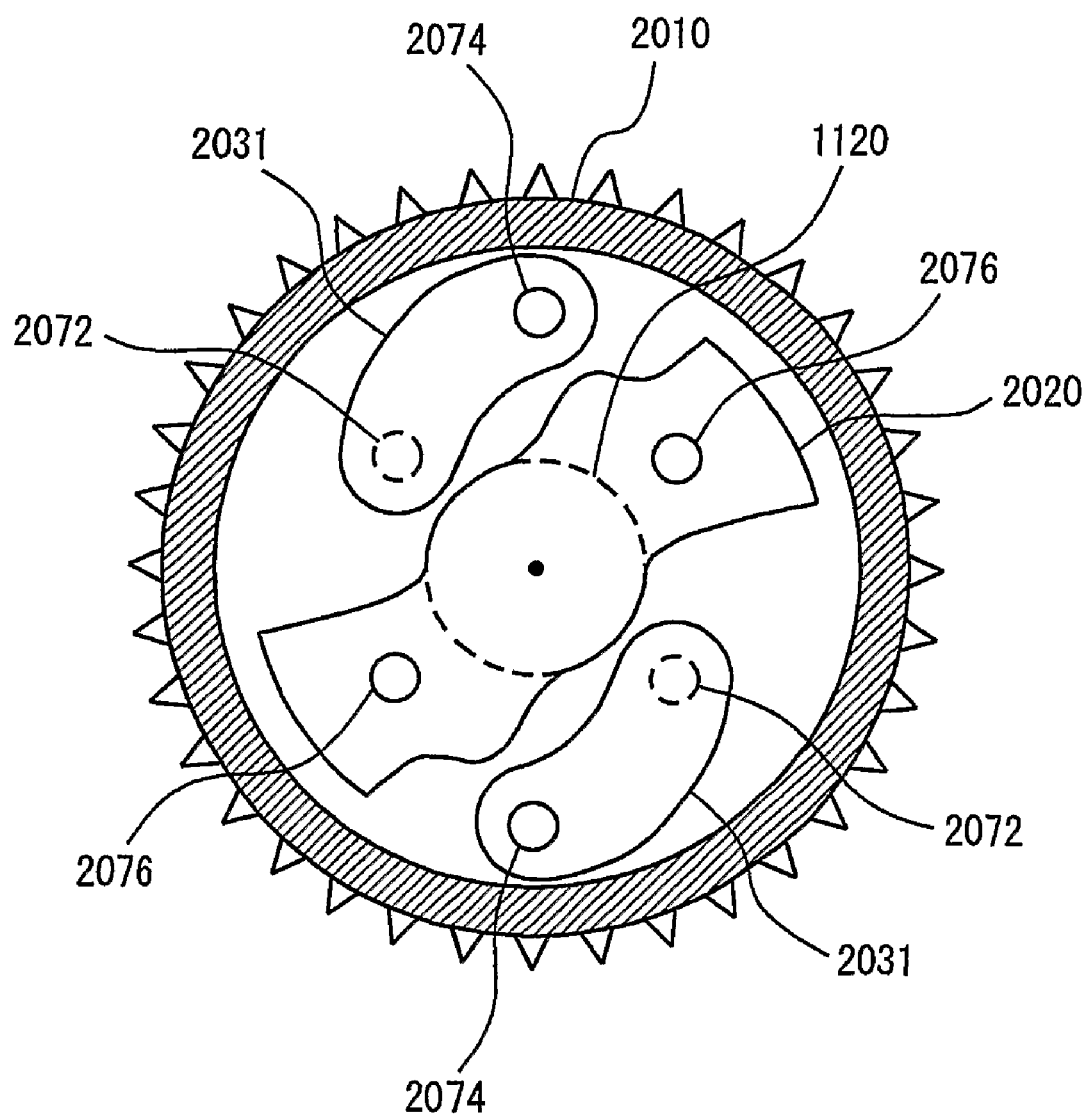

F I G. 5
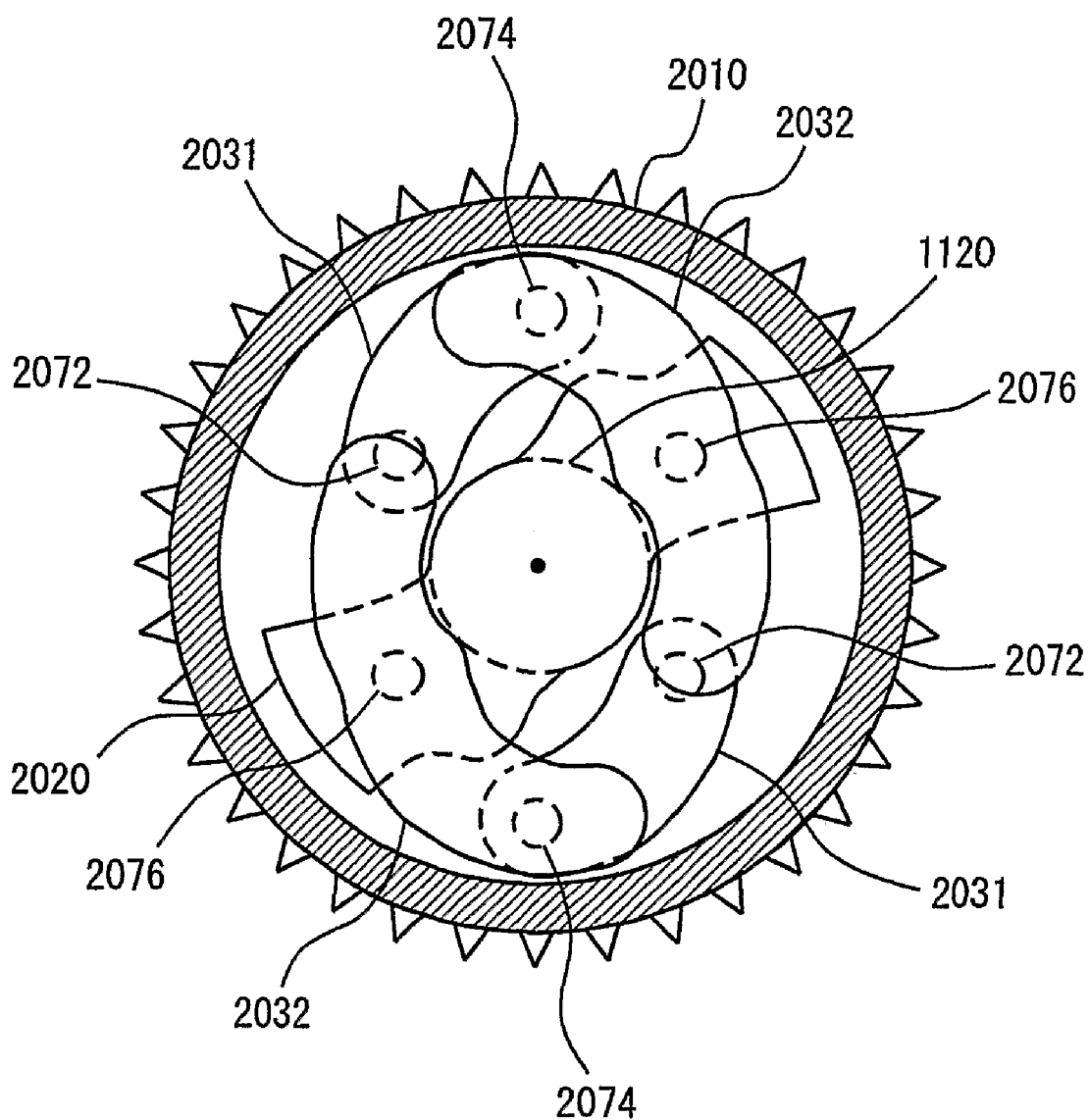

F I G. 15
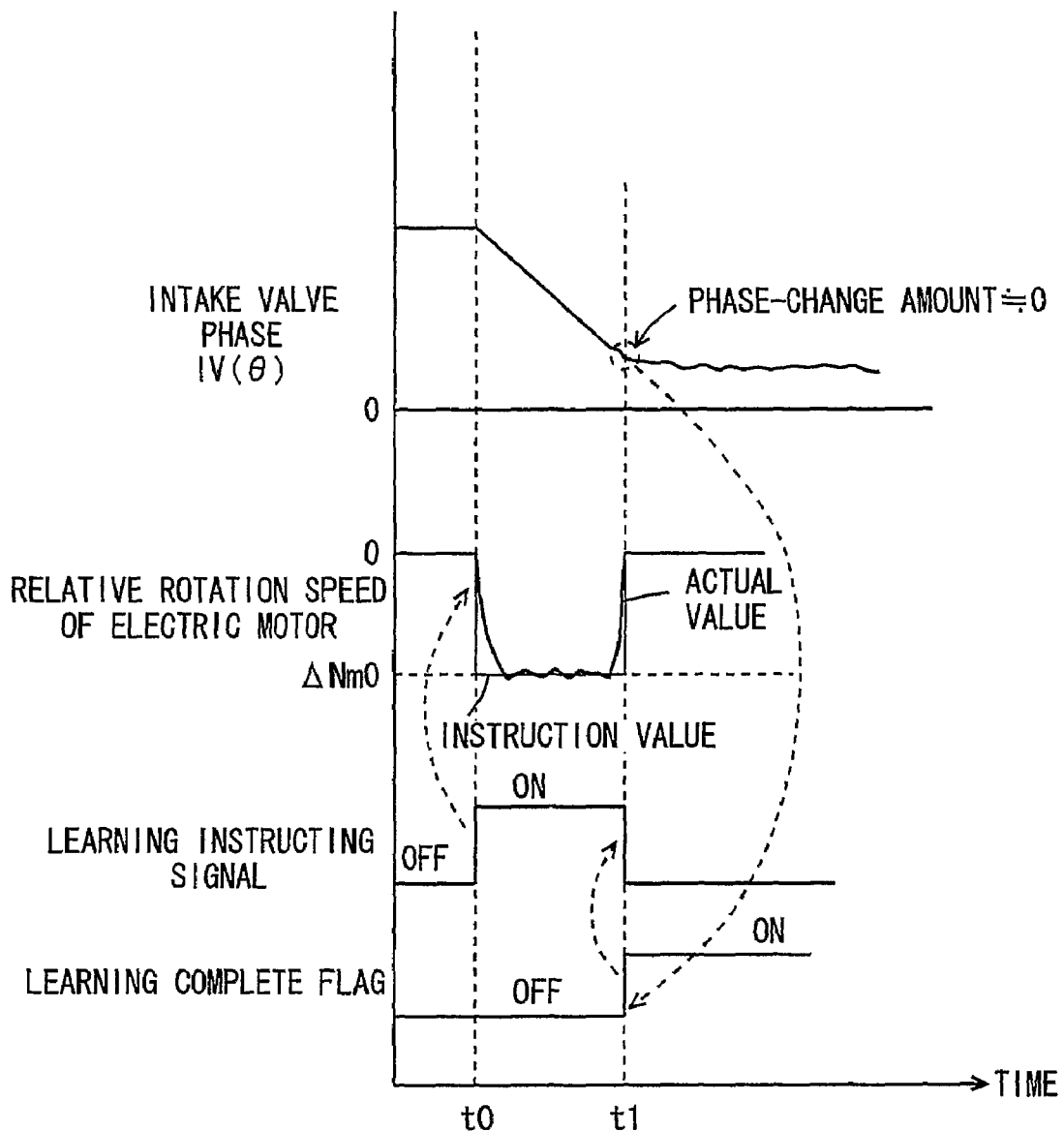

VARIABLE VALVE TIMING APPARATUS

TECHNICAL FIELD

The present invention relates to a variable valve timing apparatus and, more specifically, to a variable valve timing apparatus having a changing mechanism for changing a phase of opening/closing at least one of an intake valve and an exhaust valve in each of a plurality of cylinder groups (a plurality of banks).

BACKGROUND ART

A VVT (Variable Valve Timing) apparatus has conventionally been known that changes the timing at which an intake valve or an exhaust valve is opened/closed, that is, the opening/closing phase (crank angle) according to an operating condition. Generally, in the variable valve timing apparatus, the phase is changed by rotating a camshaft, which opens/closes the intake valve or exhaust valve, relative to a sprocket or the like. The camshaft is rotated by an actuator such as a hydraulic or electric motor.

In an engine having a configuration with a plurality of cylinder groups (banks), the VVT mechanism is provided in each bank. Therefore, when the amount of air introduced to the cylinders differs bank by bank in such an engine configuration, variation of engine rotation (variation in rotation speed while the crankshaft rotates once) tends to occur, which may lead to larger engine vibration. Therefore, it is necessary to adjust setting of valve timings among the cylinder groups (banks).

In this respect, Japanese Patent Laying-Open No. 2003-172160 (Patent Document 1) discloses a variable valve timing control device of an internal combustion engine that enables matching of responsiveness to valve timing control among a plurality of cylinders, even if there is imbalance in camshaft load torque among the plurality of cylinders due to difference in the type of accessories. Particularly, Patent Document 1 addresses the design in which accessories such as a fuel pump (particularly a high-pressure pump supplying fuel to an in-cylinder direct injector) and a vacuum pump are driven only by the camshaft on the cylinder group of one side (bank of one side). Specifically, in consideration of a delay in valve timing control of a specific cylinder group caused by the load of accessories, the amount of control of a valve timing adjusting portion for the specific cylinder group and/or the other cylinder group is corrected so that the responsiveness to valve timing control of the specific cylinder group matches the responsiveness to valve timing control of the other cylinder group.

In order to accurately control the valve opening/closing phase (valve timing) using a variable valve timing apparatus, it is necessary to prevent error in detecting the actual phase of valve opening/closing. In order to reduce the detection error, it has been a common practice to set the valve opening/closing phase at a prescribed reference position that is limited mechanically, and to learn the error in the detected value of valve opening/closing phase at that time as an offset (see, for example, Japanese Patent Laying-Open No. 2004-156461).

In a variable valve timing apparatus disclosed in Patent Document 2 (Japanese Patent Laying-Open No. 2004-156461), reference position of the valve timing is learned under prescribed learning conditions (for example, every time engine operation starts), to ensure detection accuracy of the actual valve timing. Further, according to the disclosure, when learning is not complete, it is determined that the detection accuracy is low, and the rate of change in valve timing is limited. Consequently, damage to the apparatus caused by a movable portion hitting a stopper or the like at high speed can be prevented.

As described above, in the engine having a configuration with a plurality of cylinder groups (banks), consideration is necessary to match valve timing settings among the cylinder groups (banks) at the time of valve timing control also during such reference position learning as described in Patent Document 2. Patent Document 2, however, is silent about how to execute the reference position learning for the variable valve timing setting apparatus provided in the engine of such a configuration.

DISCLOSURE OF THE INVENTION

An object of the present invention is, in a variable valve timing apparatus having the VVT mechanism provided in each of a plurality of cylinder groups (banks), to execute appropriate reference position learning of the valve timing such that variation in the amount of air introduced to the cylinders among the cylinder groups (banks) is suppressed at the time of valve timing control, so as to maintain good combustion characteristics.

The present invention provides a variable valve timing apparatus provided in an engine having a plurality of cylinder groups, including a changing mechanism, a reference position learning portion, a learning completion confirming portion, and a control start limiting portion. The changing mechanism is provided corresponding to each of the plurality of cylinder groups, and each is configured to change, in the corresponding cylinder group, an opening/closing timing of at least one of an intake valve and an exhaust valve. The reference position learning portion is provided corresponding to each changing mechanism, and is configured to generate an operation command for changing the opening/closing timing to a prescribed timing to the actuator of the corresponding changing mechanism when reference position learning is instructed and, when the opening/closing timing has reached the prescribed timing, to learn the reference of the opening/closing timing in response. The learning completion confirming portion confirms whether the reference position learning by the reference position learning portion has been completed in every changing mechanism or not. The control start limiting portion inhibits, in each changing mechanism, start of the opening/closing timing control for changing the opening/closing timing following a successively set target value, until it is confirmed by the learning completion confirming portion that the reference position learning has been completed in every changing mechanism.

Alternatively, the present invention provides a variable valve timing apparatus provided in an engine having a plurality of cylinder groups, including a changing mechanism, and a control unit for controlling the operation of the changing mechanism. The changing mechanism is provided corresponding to each of the plurality of cylinder groups, and each is configured to change, in the corresponding cylinder group, an opening/closing timing of at least one of an intake valve and an exhaust valve. The control unit is configured to execute reference position learning independently for each changing mechanism, and further configured to generate an operation command for changing the opening/closing timing to a prescribed timing to the actuator of the corresponding changing mechanism when the reference position learning is instructed, when the opening/closing timing reaches the prescribed timing, to learn the reference of the opening/closing timing in response. The control unit is further configured to confirm whether the reference position learning has been completed in every changing mechanism or not, and to inhibit, in each changing mechanism, start of the opening/closing timing control for changing the opening/closing timing following a successively set target value, until it is confirmed that the reference position learning has been completed in every changing mechanism.

The present invention provides a method of controlling a variable valve timing apparatus having, for every cylinder group, a changing mechanism for changing a timing of opening/closing at least one of an intake valve and an exhaust valve provided in an engine, including a reference position learning step, a learning completion confirming step, and a control start limiting step. In the reference position learning step, which is executed corresponding to each changing mechanism, an operation command for changing the opening/closing timing to a prescribed timing is generated to the actuator of the corresponding changing mechanism when reference position learning is instructed, and when the opening/closing timing has reached the prescribed timing, reference of the opening/closing timing is learned in response. In the learning completion confirming step, whether the reference position learning of the reference position learning step has been completed in every changing mechanism or not is confirmed. In the control start limiting step, start of the opening/closing timing control for changing the opening/closing timing following a successively set target value is inhibited in each changing mechanism, until it is confirmed in the learning completion confirming step that the reference position learning has been completed in every changing mechanism.

According to the variable valve timing apparatus or the control method thereof, until it is confirmed that the reference position learning has been completed in the changing mechanism of every cylinder group (bank), starting of valve timing control following the target value can be inhibited in each bank. Therefore, variation in the amount of intake air to the cylinders among the banks can be suppressed at the time of valve timing control, whereby satisfactory combustion characteristics can be maintained.

Preferably, in the variable valve timing apparatus in accordance with the present invention, each changing mechanism is configured to change the opening/closing timing by an amount of change in accordance with an operation amount of the actuator, and further configured such that the change in opening/closing timing is mechanically limited at the prescribed timing, at least at the time of reference position learning. The reference position learning portion generates an actuator operation command in each changing mechanism so that the timing at which the opening/closing timing reaches the prescribed timing differs from one changing mechanism to another, when the reference position learning is instructed. Alternatively, the control unit generates an actuator operation command in each changing mechanism so that the timing at which the opening/closing timing reaches the prescribed timing differs from one changing mechanism to another, when the reference position learning is instructed.

Preferably, in the method of controlling a variable valve timing apparatus in accordance with the present invention, each changing mechanism is configured to change the opening/closing timing by an amount corresponding to the operation amount of the actuator, and further configured such that the change in opening/closing timing is mechanically limited at the prescribed timing, at least at the time of reference position learning. In the reference position learning step, an actuator operation command in each changing mechanism is generated so that the timing at which the opening/closing timing reaches the prescribed timing differs from one changing mechanism to another, when the reference position learning is instructed.

According to the variable valve timing apparatus or the control method thereof described above, in a configuration in which the change in opening/closing timing (valve timing) is mechanically limited at the end of the reference position learning and the power consumption by the actuator increases, the timing of executing the reference position learning is shifted among the cylinder groups (banks), so that increase in power load caused by concentration of power consumption can be avoided. It follows that the timing of completion of the reference position learning also comes to differ bank by bank. Therefore, start of the valve timing control is inhibited until it is confirmed that reference position learning has been completed in every bank, whereby variation of the amount of air introduced to the cylinder among the banks can be suppressed while the valve timing is controlled.

Preferably, the variable valve timing apparatus in accordance with the present invention further includes an increasing portion. The increasing portion increases the amount of air introduced to the engine when the reference position learning is executed while the engine is in an idle operation, to be larger than when the reference position learning is not executed under the same conditions. Alternatively, the control unit generates a control command for increasing the amount of air introduced to the engine when the reference position learning is executed while the engine is in an idle operation, to be larger than when the reference position learning is not executed under the same conditions.

Preferably, in the method of controlling the variable valve timing apparatus in accordance with the present invention further includes an increasing step. In the increasing step, when the reference position learning is executed while the engine is in idle operation, an amount of air introduced to the engine is increased to be larger than when the reference position learning is not executed under the same conditions.

According to the variable valve timing apparatus or the control method thereof described above, when the reference position learning is executed while the engine is in an idle operation, the amount of air introduced to the engine can be increased relatively. Therefore, the opening/closing timing (valve timing) may be set to the prescribed timing for the reference position learning without the necessity of considering combustion characteristics, and hence, engine stall caused by deteriorated combustion characteristics can be prevented.

Further, in the variable valve timing apparatus or the control method thereof in accordance with the present invention, in each changing mechanism, the prescribed timing is provided at a mechanical limit position of the variable range of the opening/closing timing.

According to the variable valve timing apparatus or the control method thereof described above, the reference position learning can be executed without adding any special mechanism, by using the limit position (such as the phase of most retarded angle) of the variable range of opening/closing timing (valve timing).

Alternatively, or more preferably, in the variable valve timing apparatus or the control method thereof in accordance with the present invention, the actuator is implemented by an electric motor, and the changing mechanism is configured to change the opening/closing timing by an amount of change corresponding to the difference in rotation speed of the electric motor relative to the rotation speed of the camshaft driving the valve of which opening/closing timing is to be changed.

According to the variable valve timing apparatus or the control method thereof described above, in a configuration in which an electric motor serves as the actuator and the operation amount of the actuator is difference in rotation speed of the electric motor relative to the rotation speed of a camshaft of which rotation is stopped as the engine stops, variation of the amount of air introduced to cylinders among the cylinder groups (banks) can be suppressed at the time of valve timing control, and satisfactory combustion characteristics can be maintained.

Therefore, a main advantage of the present invention is, in a configuration having a VVT mechanism provided in every one of a plurality of cylinder groups (banks), that the reference position learning can be executed appropriately to suppress variation of the amount of air introduced to the cylinders among the cylinder groups (banks) at the time of valve timing control and to maintain satisfactory combustion characteristics.

BRIEF DESCRIPTION OF THE DRAWINGS

FIG. 1 is a schematic diagram showing a configuration of an engine of a vehicle on which the variable valve timing apparatus in accordance with an embodiment of the present invention is mounted.

FIG. 4 is a cross section along A-A in FIG. 3.

FIG. 5 is a (first) cross section along B-B in FIG. 3.

FIG. 15 is a diagram of waveforms at the time of reference position learning shown in FIG. 14.

BEST MODES FOR CARRYING OUT THE INVENTION

Figure 2:
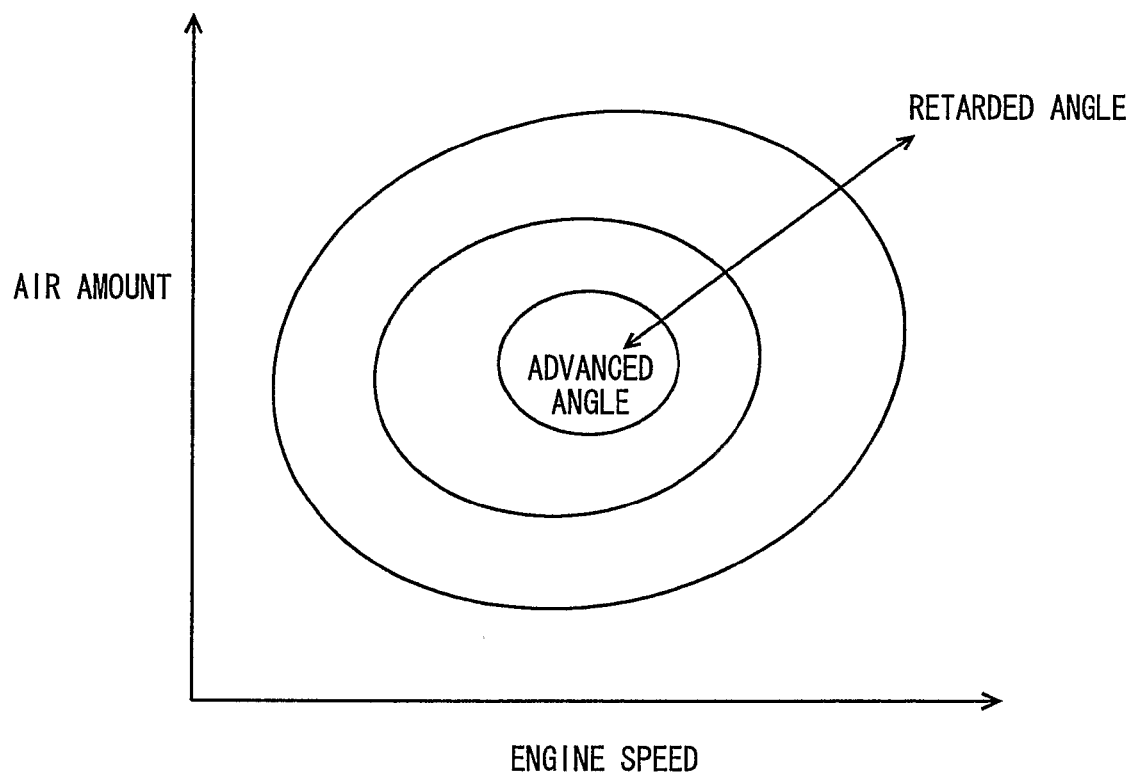
FIG. 2 shows a map defining the phase of an intake camshaft.

With reference to the drawings, embodiments of the present invention will be hereinafter described. In the following description, like components are denoted by like reference characters. Their names and functions are also the same. Therefore, detailed description thereof will not be repeated.

Referring to FIG. 1, a description is given of an engine of a vehicle on which a variable valve timing apparatus is mounted, according to an embodiment of the present invention.

An engine 1000 is a V-type 8-cylinder engine having a first bank 1010 and a second bank 1012 each including a group of four cylinders. Here, application of the present invention is not limited to any engine type, and the variable valve timing apparatus that will be described in the following is applicable to an engine of the type different from the V-type 8 cylinder engine.

Into engine 1000, air is sucked from an air cleaner 1020. The quantity of sucked air is adjusted by a throttle valve 1030. Throttle valve 1030 is an electronic throttle valve driven by a motor.

The air is supplied through an intake manifold 1032 into a cylinder 1040. The air is mixed with fuel in cylinder 1040 (combustion chamber). Into cylinder 1040, the fuel is directly injected from an injector 1050. In other words, injection holes of injector 1050 are provided within cylinder 1040.

The fuel is injected in the intake stroke. The fuel injection timing is not limited to the intake stroke. Further, in the present embodiment, engine 1000 is described as a direct-injection engine having injection holes of injector 1050 that are disposed within cylinder 1040. However, in addition to direct-injection (in-cylinder) injector 1050, a port injector may be provided. Moreover, only the port injector may be provided.

The air-fuel mixture in cylinder 1040 is ignited by a spark plug 1060 and accordingly burned. The air-fuel mixture after burned, namely exhaust gas, is cleaned by a three-way catalyst 1070 and thereafter discharged to the outside of the vehicle. The air-fuel mixture is burned to press down a piston 1080 and thereby to rotate a crankshaft 1090.

At the top of cylinder 1040, an intake valve 1100 and an exhaust valve 1110 are provided. Intake valve 1100 is driven by an intake camshaft 1120. Exhaust valve 1110 is driven by an exhaust camshaft 1130. Intake camshaft 1120 and exhaust camshaft 1130 are coupled by such parts as a chain and gears to be rotated at the same rotation speed (one-half the rotation speed of crankshaft 1090). The rotation speed of a rotating body such as a shaft is generally represented by the number of rotations per unit time (typically, number of rotations per minute: rpm).

Intake valve 1100 has its phase (opening/closing timing) controlled by an intake VVT mechanism 2000 provided to intake camshaft 1120. Exhaust valve 1110 has its phase (opening/closing timing) controlled by an exhaust VVT mechanism 3000 provided to exhaust camshaft 1130.

In the present embodiment, intake camshaft 1120 and exhaust camshaft 1130 are rotated by the VVT mechanisms to control respective phases of intake valve 1100 and exhaust valve 1110. Here, the phase control method is not limited to the one described above. As shown in the figure, the VVT mechanism is provided bank by bank.

Figure 3:
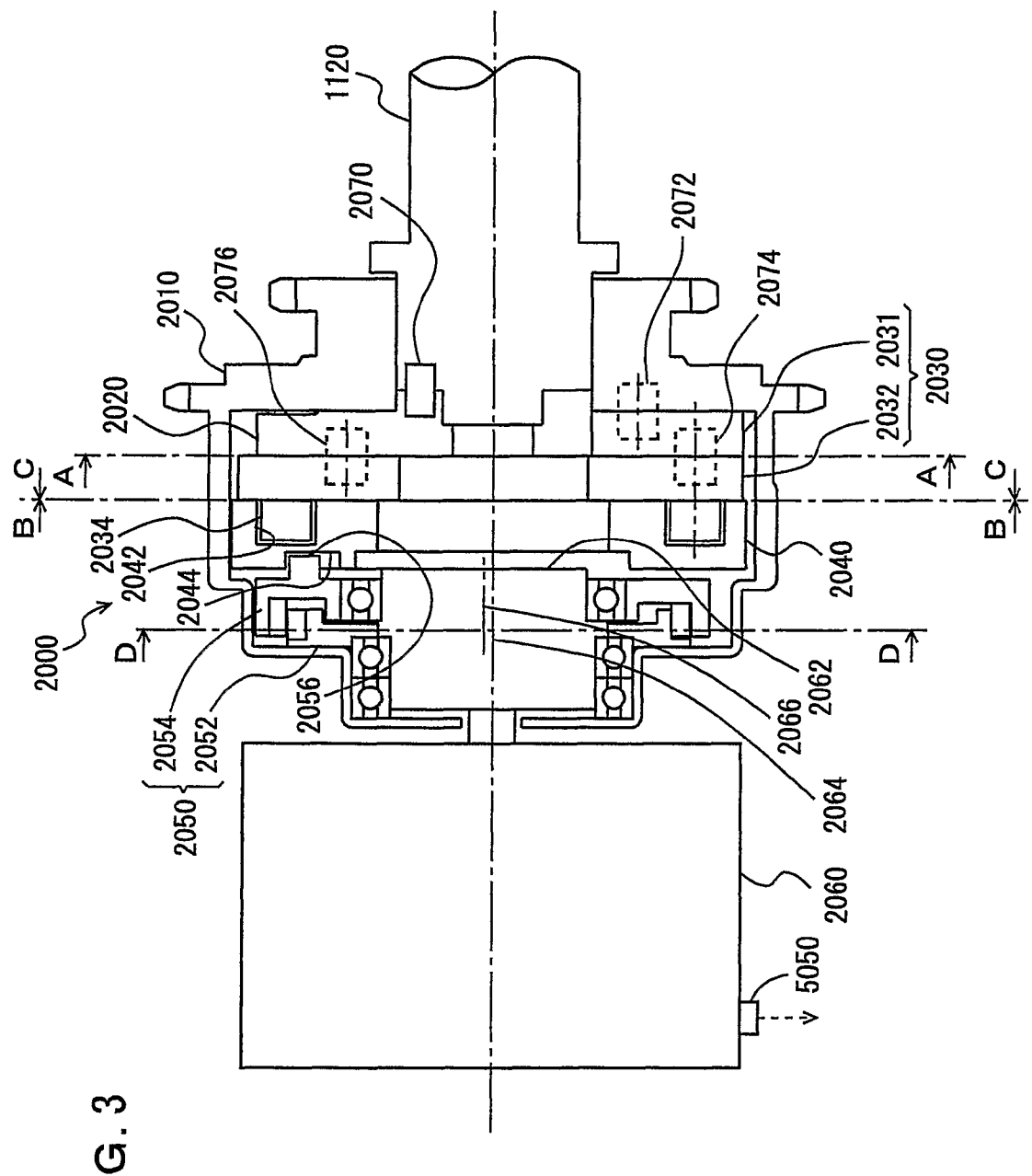
FIG. 3 is a cross section showing an intake VVT mechanism.

Intake VVT mechanism 2000 is operated by an electric motor 2060 (shown in FIG. 3). Electric motor 2060 is controlled by an Electronic Control Unit (ECU) 4000. The current and voltage of electric motor 2060 are detected by an ammeter (not shown) and a voltmeter (not shown) and the measurements are input to ECU 4000.

Exhaust VVT mechanism 3000 is hydraulically operated. Here, intake VVT mechanism 2000 may be hydraulically operated while exhaust VVT mechanism 3000 may be operated by an electric motor.

To ECU 4000, signals indicating the rotation speed and the crank angle of crankshaft 1090 are input from a crank angle sensor 5000. Further, to ECU 4000, signals indicating respective phases of intake camshaft 1120 and exhaust camshaft 1130 (phase: the camshaft position in the rotational direction) are input from a cam position sensor 5010.

Furthermore, to ECU 4000, a signal indicating the water temperature (coolant temperature) of engine 1000 from a coolant temperature sensor 5020 as well as a signal indicating the quantity of intake air (quantity of air taken or sucked into engine 1000) of engine 1000 from an airflow meter 5030 are input.

Based on these signals input from the sensors as well as a map and a program stored in a memory (not shown), ECU 4000 controls the throttle opening position, the ignition timing, the fuel injection timing, the quantity of injected fuel, the phase of intake valve 1100 and the phase of exhaust valve 1110, for example, so that engine 1000 is operated in a desired operating state.

In the present embodiment, ECU 4000 determines the phase of intake valve 1100 based on the map as shown in FIG. 2 that uses the engine speed NE and the intake air quantity KL as parameters. A plurality of maps for respective coolant temperatures are stored for determining the phase of intake valve 1100.

In the following, a further description is given of intake VVT mechanism 2000. Here, exhaust VVT mechanism 3000 may have the same configuration as that of intake VVT mechanism 2000 as described below, or each of intake VVT mechanism 2000 and exhaust VVT mechanism 3000 may have the same configuration as that of intake VVT mechanism 2000 as described below.

As shown in FIG. 3, intake VVT mechanism 2000 includes a sprocket 2010, a cam plate 2020, a link mechanism 2030, a guide plate 2040, reduction gears 2050, and electric motor 2060.

Sprocket 2010 is coupled via a chain or the like to crankshaft 1090. The rotation speed of sprocket 2010 is half the rotation speed of crankshaft 1090, as in the case of intake camshaft 1120 and exhaust camshaft 1130. Intake camshaft 1120 is provided concentrically with the rotational axis of sprocket 2010 and rotatable relative to sprocket 2010.

Cam plate 2020 is coupled to intake camshaft 1120 with a pin (1) 2070. Cam plate 2020 rotates, in sprocket 2010, together with intake camshaft 1120. Here, cam plate 2020 and intake camshaft 1120 may be integrated into one unit.

Link mechanism 2030 is comprised of an arm (1) 2031 and an arm (2) 2032. As shown in FIG. 4, which is a cross section along A-A in FIG. 3, a pair of arms (1) 2031 is provided within sprocket 2010 so that the arms are point symmetric to each other with respect to the rotational axis of intake camshaft 1120. Each arm (1) 2031 is coupled to sprocket 2010 so that the arm can swing about a pin (2) 2072.

Figure 6:
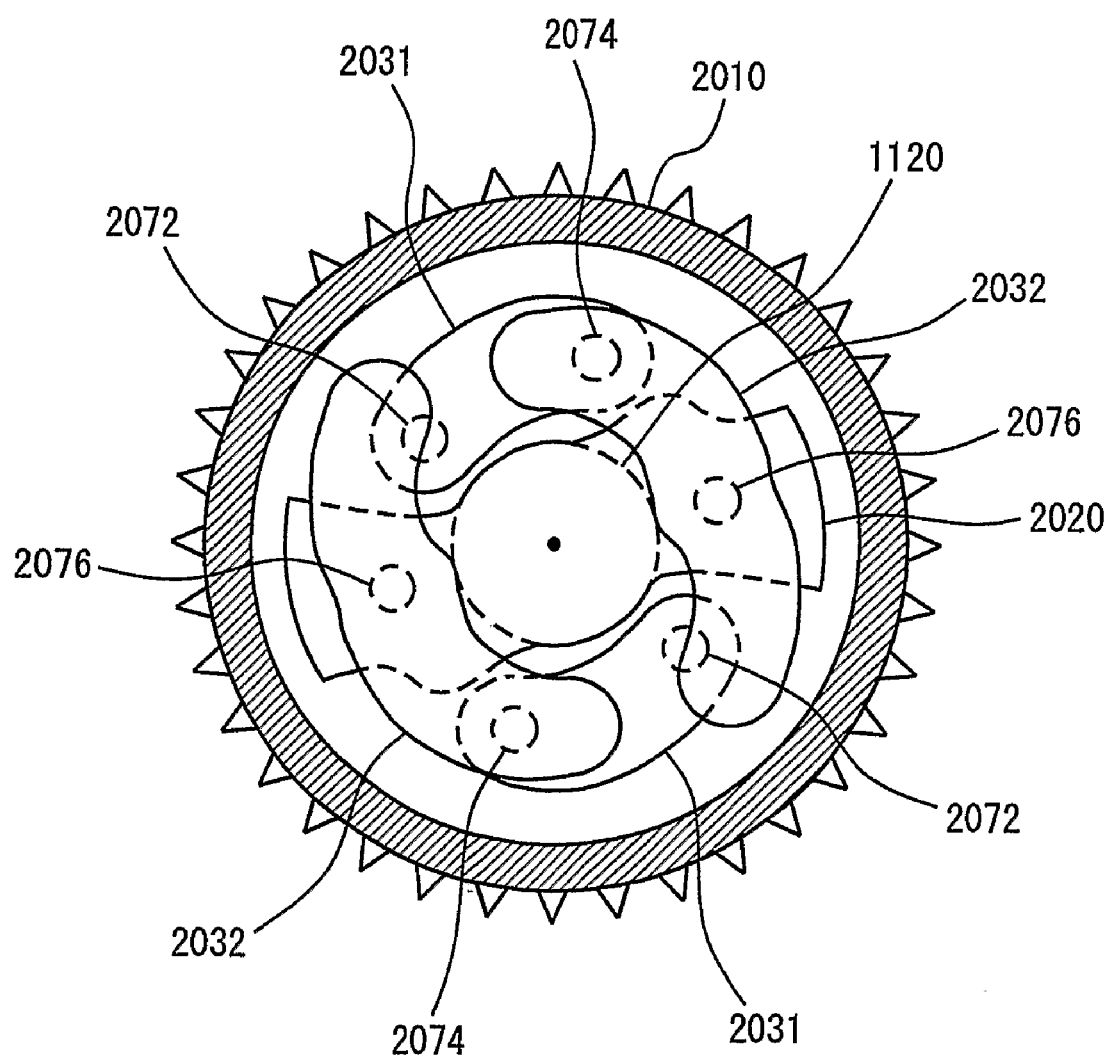
FIG. 6 is a (second) cross section along B-B in FIG. 3.

As shown in FIG. 5, which is a cross section along B-B in FIG. 3, and as shown in FIG. 6 showing the state where the phase of intake valve 1100 is advanced with respect to the state in FIG. 5, arms (1) 2031 and cam plate 2020 are coupled by arms (2) 2032.

Arm (2) 2032 is supported such that the arm can swing about a pin (3) 2074 and with respect to arm (1) 2031. Further, arm (2) 2032 is supported such that the arm can swing about a pin (4) 2076 and with respect to cam plate 2020.

A pair of link mechanisms 2030 causes intake camshaft 1120 to rotate relative to sprocket 2010 and thereby changes the phase of intake valve 1100. Thus, even if one of the paired link mechanisms 2030 should be damaged or broken, the other link mechanism can be used to change the phase of intake valve 1100.

Referring back to FIG. 3, at a surface of each link mechanism 2030 (arm (2) 2032) that is a surface facing guide plate 2040, a control pin 2034 is provided. Control pin 2034 is provided concentrically with pin (3) 2074. Each control pin 2034 slides in a guide groove 2042 provided in guide plate 2040.

Each control pin 2034 slides in guide groove 2042 of guide plate 2040, to be shifted in the radial direction. The radial shift of each control pin 2034 causes intake camshaft 1120 to rotate relative to sprocket 2010.

Figure 7:
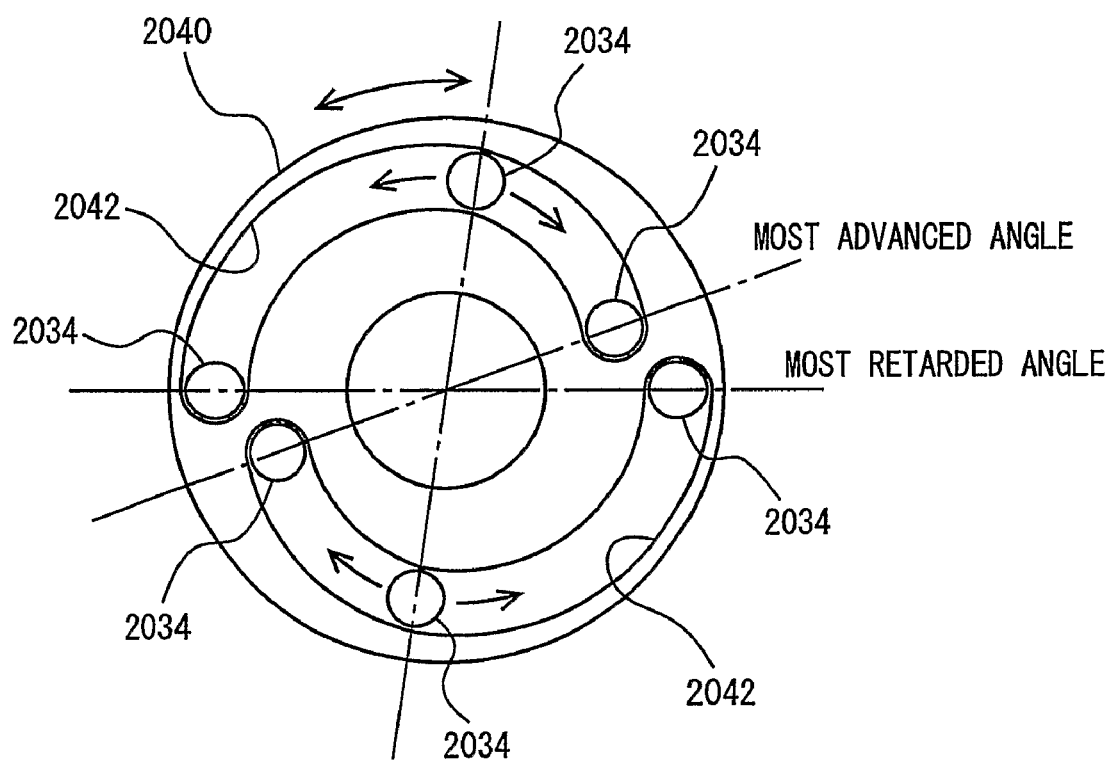
FIG. 7 is a cross section along C-C in FIG. 3.

As shown in FIG. 7, which is a cross section along C-C in FIG. 3, guide groove 2042 is formed in the spiral shape so that rotation of guide plate 2040 causes each control pin 2034 to shift in the radial direction. Here, the shape of guide groove 2042 is not limited to this.

As control pin 2034 is shifted further in the radial direction from the axial center of guide plate 2040, the phase of intake valve 1100 is retarded to a greater extent. In other words, the amount of change of the phase has a value corresponding to the operation amount of link mechanism 2030 generated by the radial shift of control pin 2034. Alternatively, the phase of intake valve 1100 may be advanced to a greater extent as control pin 2034 is shifted further in the radial direction from the axial center of guide plate 2040.

As shown in FIG. 7, when control pin 2034 abuts on an end of guide groove 2042, the operation of link mechanism 2030 is restrained. Therefore, the phase in which control pin 2034 abuts on an end of guide groove 2042 is the phase of the most retarded angle or the most advanced angle.

Referring back to FIG. 3, in guide plate 2040, a plurality of depressed portions 2044 are provided in its surface facing reduction gears 2050, for coupling guide plate 2040 and reduction gears 2050 to each other.

Reduction gears 2050 are comprised of an outer teeth gear 2052 and an inner teeth gear 2054. Outer teeth gear 2052 is fixed with respect to sprocket 2010 so that the gear rotates together with sprocket 2010.

Inner teeth gear 2054 has a plurality of protruded portions 2056 thereon that are received in depressed portions 2044 of guide plate 2040. Inner teeth gear 2054 is supported rotatably about an eccentric axis 2066 of a coupling 2062 formed eccentrically with respect to an axial center 2064 of an output shaft of electric motor 2060.

Figure 8:
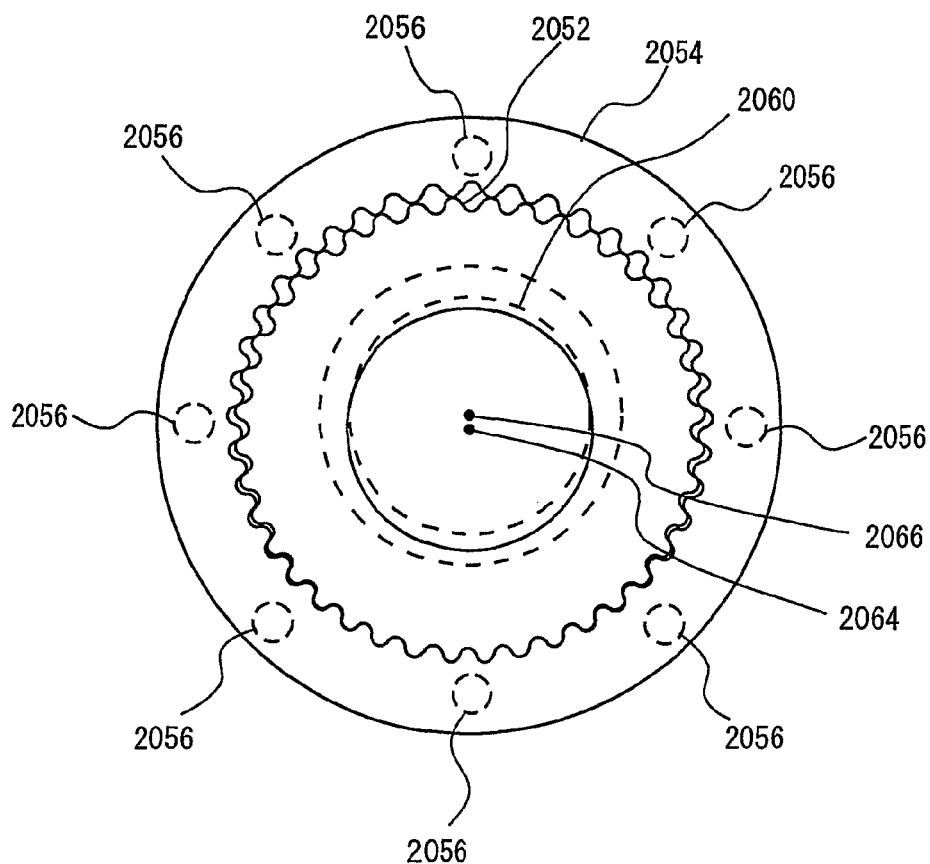
FIG. 8 is a cross section along D-D in FIG. 3.

FIG. 8 shows a cross section along D-D in FIG. 3. Inner teeth gear 2054 is provided such that a part of the teeth thereof meshes with outer teeth gear 2052. When the rotation speed of the output shaft of electric motor 2060 is identical to the rotation speed of sprocket 2010, coupling 2062 and inner teeth gear 2054 rotate at the same rotation speed as that of outer teeth gear 2052 (sprocket 2010). In this case, guide plate 2040 rotates at the same rotation speed as that of sprocket 2010 and accordingly the phase of intake valve 1100 is maintained.

When electric motor 2060 causes coupling 2062 to rotate about axial center 2064 and relative to outer teeth gear 2052, inner teeth gear 2054 as a whole accordingly revolves about axial center 2064 while inner teeth gear 2054 rotates about eccentric axis 2066. The rotational motion of inner teeth gear 2054 causes guide plate 2040 to rotate relative to sprocket 2010 and thus the phase of intake valve 1100 is changed.

The phase of intake valve 1100 is changed by reduction of the rotation speed of relative rotation between the output shaft of electric motor 2060 and sprocket 2010 (operation amount of electric motor 2060) by reduction gears 2050, guide plate 2040 and link mechanism 2030. Here, the rotation speed of relative rotation between the output shaft of electric motor 2060 and sprocket 2010 may be increased to change the phase of intake valve 1100. On the output shaft of electric motor 2060, a motor rotation angle sensor 5050 is provided, which outputs a signal indicating an angle of rotation (position of the output shaft in the rotating direction) of the output shaft. Motor rotation angle sensor 5050 is generally configured to generate a pulse signal every time the output shaft of electric motor rotates by a prescribed angle. Based on the output of motor rotation angle sensor 5050, the rotation speed of the output shaft of electric motor 2060 (hereinafter also simply referred to as rotation speed of electric motor 2060) can be detected.

Figure 9:
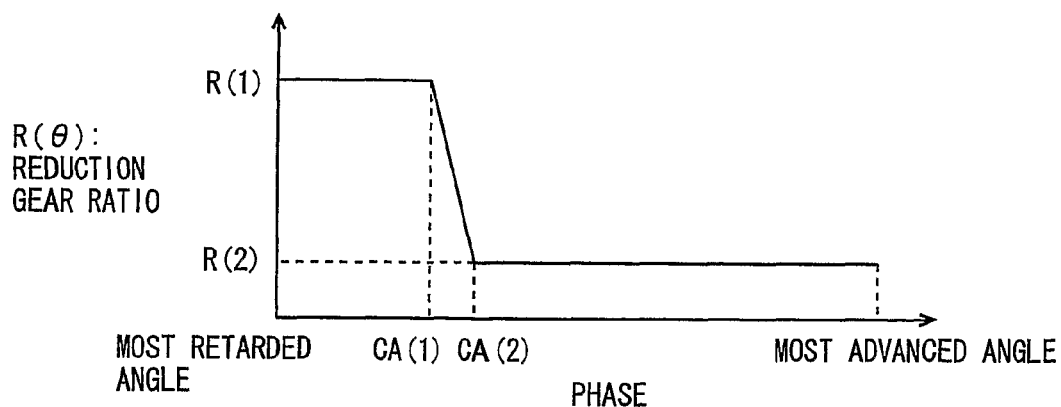
FIG. 9 shows the reduction gear ratio of the intake VVT mechanism as a whole.

As shown in FIG. 9, the reduction gear ratio R(θ) of intake VVT mechanism 2000 as a whole, that is, the ratio of rotation speed of relative rotation between the output shaft of electric motor 2060 and sprocket 2010 to the amount of phase-change, may have a value according to the phase of intake valve 1100. In the present embodiment, as the reduction gear ratio R(θ) is higher, the amount of phase-change with respect to the rotation speed of relative rotation between the output shaft of electric motor 2060 and sprocket 2010 is smaller.

In the case where the phase of intake valve 1100 is in a first region from the most retarded angle to CA (1), the reduction gear ratio of intake VVT mechanism 2000 as a whole is R (1). In the case where the phase of intake valve 1100 is in a second region from CA (2) (CA (2) is advanced with respect to CA (1)) to the most advanced angle, the reduction gear ratio of intake VVT mechanism 2000 as a whole is R (2) (R (1)>R (2)).

In the case where the phase of intake valve 1100 is in a third region from CA (1) to CA (2), the reduction gear ratio of intake VVT mechanism 2000 as a whole changes at a predetermined rate of change ((R (2)−R (1))/(CA (2)−CA (1))).

Based on the configuration as described above, intake VVT mechanism 2000 of the variable valve timing apparatus of the present embodiment functions as described below.

Figure 10:
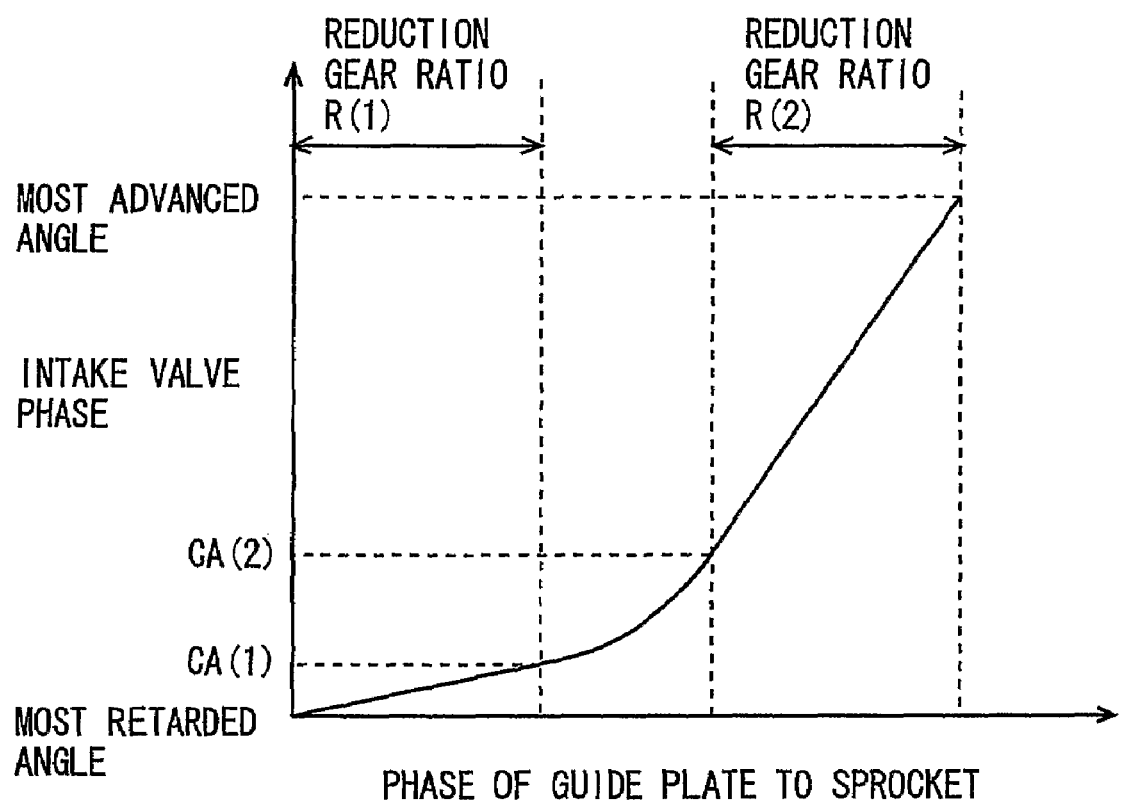
FIG. 10 shows a relation between the phase of a guide plate relative to a sprocket and the phase of an intake camshaft.

When the phase of intake valve 1100 (intake camshaft 1120) is to be advanced, electric motor 2060 is operated to rotate guide plate 2040 relative to sprocket 2010, thereby advancing the phase of intake valve 1100 as shown in FIG. 10.

When the phase of intake valve 1100 is in the first region between the most retarded angle and CA (1), the rotation speed of relative rotation between the output shaft of electric motor 2060 and sprocket 2010 is reduced at reduction gear ratio R (1) and the phase of intake valve 1100 is advanced.

In the case where the phase of intake valve 1100 is in the second region between CA (2) and the most advanced angle, the rotation speed of relative rotation between the output shaft of electric motor 2060 and sprocket 2010 is reduced at reduction gear ratio R (2) and the phase of intake valve 1100 is advanced.

When the phase of intake valve 1100 is to be retarded, the output shaft of electric motor 2060 is rotated relative to sprocket 2010 in the direction opposite to the direction when the phase thereof is to be advanced. As in the case of advancing the phase, when the phase is to be retarded and the phase of intake valve 1100 is in the first region between the most retarded angle and CA (1), the rotation speed of relative rotation between the output shaft of electric motor 2060 and sprocket 2010 is reduced at reduction gear ratio R (1) and the phase is retarded. Further, when the phase of intake valve 1100 is in the second region between CA (2) and the most advanced angle, the rotation speed of relative rotation between the output shaft of electric motor 2060 and sprocket 2010 is reduced at reduction gear ratio R (2) and the phase is retarded.

Accordingly, as long as the direction of the relative rotation between the output shaft of electric motor 2060 and sprocket 2010 is the same, the phase of intake valve 1100 can be advanced or retarded for both of the first region between the most retarded angle and CA (1) and the second region between CA (2) and the most advanced angle. Here, for the second region between CA (2) and the most advanced angle, the phase can be more advanced or more retarded. Thus, the phase can be changed over a wide range.

Further, since the reduction gear ratio is high for the first region between the most retarded angle and CA (1), a large torque is necessary, for rotating the output shaft of electric motor 2060 by a torque acting on intake camshaft 1120 as engine 1000 operates. Therefore, even if electric motor 2060 generates no torque as in the case where electric motor 2060 is stopped, rotation of the output shaft of electric motor 2060 caused by the torque acting on intake camshaft 1120 can be prevented. Therefore, a change of the actual phase from a phase determined under control can be restrained.

As described above, in intake VVT mechanism 2000, as there is the reduction gear ratio R(θ), unintended change in phase is less likely when power supply to electric motor 2060 as the actuator is stopped. This effect is particularly well achieved in the first region that covers the phase of the most retarded angle.

When the phase of intake valve 1100 is in the third region between CA (1) and CA (2), the rotation speed of relative rotation between the output shaft of electric motor 2060 and sprocket 2010 is reduced at a reduction gear ratio that changes at a predetermined rate of change, which may result in advance or retard in phase of intake valve 1100.

Accordingly, when the phase changes from the first region to the second region or from the second region to the first region, the amount of change of the phase with respect to the rotation speed of relative rotation between the output shaft of electric motor 2060 and sprocket 2010 can be increased or decreased gradually. In this way, a sudden stepwise change of the amount of change in phase can be restrained, to thereby restrain a sudden change in phase. Accordingly, phase controllability can be improved.

As discussed above, in the intake VVT mechanism for the variable valve timing apparatus in the present embodiment, when the phase of the intake valve is in the region from the most retarded angle to CA (1), reduction gear ratio of intake VVT mechanism 2000 as a whole is R (1). When the phase of the intake valve is in the region from CA (2) to the most advanced angle, the reduction gear ratio of intake VVT mechanism 2000 as a whole is R (2), which is lower than R (1). Thus, as long as the rotational direction of the output shaft of the electric motor is the same, the phase of the intake valve can be advanced or retarded for both of the regions, namely the first region between the most retarded angle and CA (1) and the second region between CA (2) and the most advanced angle. Here, for the second region between CA (2) and the most advanced angle, the phase can be advanced or retarded to a greater extent. Therefore, the phase can be changed over a wide range. Further, for the first region between the most retarded angle and CA (1), the reduction gear ratio is high and therefore, it is possible to prevent rotation of the output shaft of the electric motor by the torque acting on the intake camshaft as the engine is operated. Thus, a change of the actual phase from a phase determined under control can be restrained. Accordingly, the phase can be changed over a wide range and the phase can be controlled accurately.

Next, the structure for controlling the phase of intake valve 1100 (hereinafter also simply referred to as the intake valve phase) will be described in detail.

Figure 11:
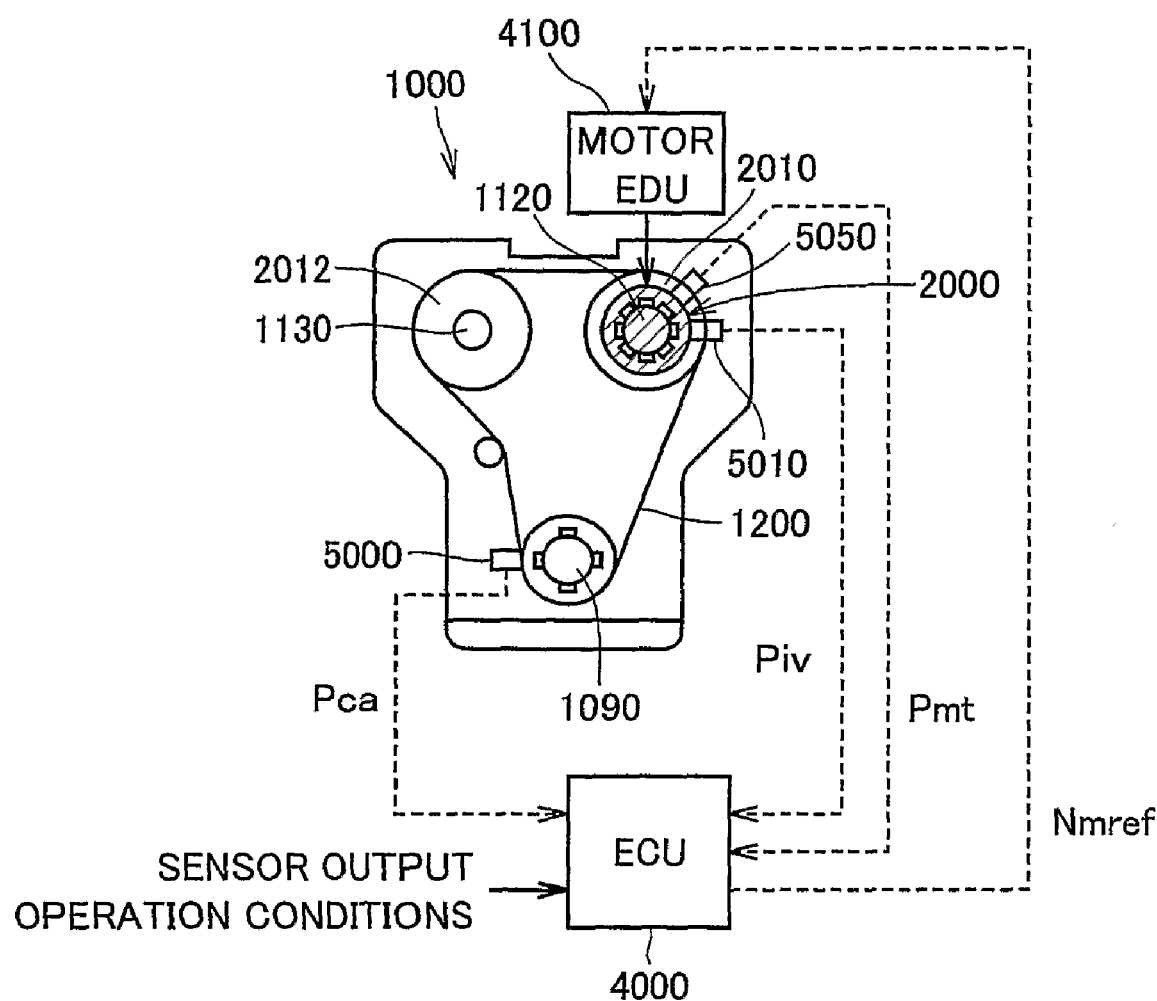
FIG. 11 is a schematic block diagram illustrating a control structure of intake valve phase by the variable valve timing apparatus in accordance with the present embodiment.

Referring to FIG. 11, as already described with reference to FIG. 1, engine 1000 is configured such that power from crankshaft 1090 is transmitted to intake camshaft 1120 and exhaust camshaft 1130 through sprockets 2010 and 2012, respectively, by means of a timing chain 1200 (or a timing belt). Further, on the outer circumferential side of intake camshaft 1120, a cam position sensor 5010 is attached, for outputting a cam angle signal Piv, at every prescribed cam angle. On the outer circumferential side of crankshaft 1090, a crank angle sensor 5000 is attached, for outputting a crank angle signal Pca, at every prescribed crank angle. Further, on a rotor (not shown) of electric motor 2060, a motor rotation angle sensor 5050 is attached, for outputting a motor rotation angle signal Pmt, at every prescribed rotation angle. The cam angle signal Piv, crank angle signal Pca and motor rotation angle signal Pmt are input to ECU 4000.

Further, based on the outputs of sensors detecting the state of engine 1000 and on operation conditions (pedal operation of the driver, current vehicle speed and the like), ECU 4000 controls the operation of engine 1000 so that required output of engine 1000 can be attained. As a part of engine control, ECU 4000 sets phase target values of intake valve 1100 and exhaust valve 1110, based on the map shown in FIG. 2.

Further, ECU 4000 generates a rotation speed command value Nmref of electric motor 2060 as the actuator of intake VVT mechanism 2000 such that the phase of intake valve 1100 reaches the target phase. The rotation speed command Nmref is determined corresponding to the rotation speed of output shaft of electric motor 2060 relative to sprocket 2010 (intake camshaft 1120), as will be described later. The difference in rotation speed of electric motor 2060 relative to intake camshaft 1120 corresponds to the operation amount of actuator. Motor EDU (Electronic Drive Unit) 4100 controls the rotation speed of electric motor 2060, in accordance with the rotation speed command Nmref from ECU 4000.

Figure 12:
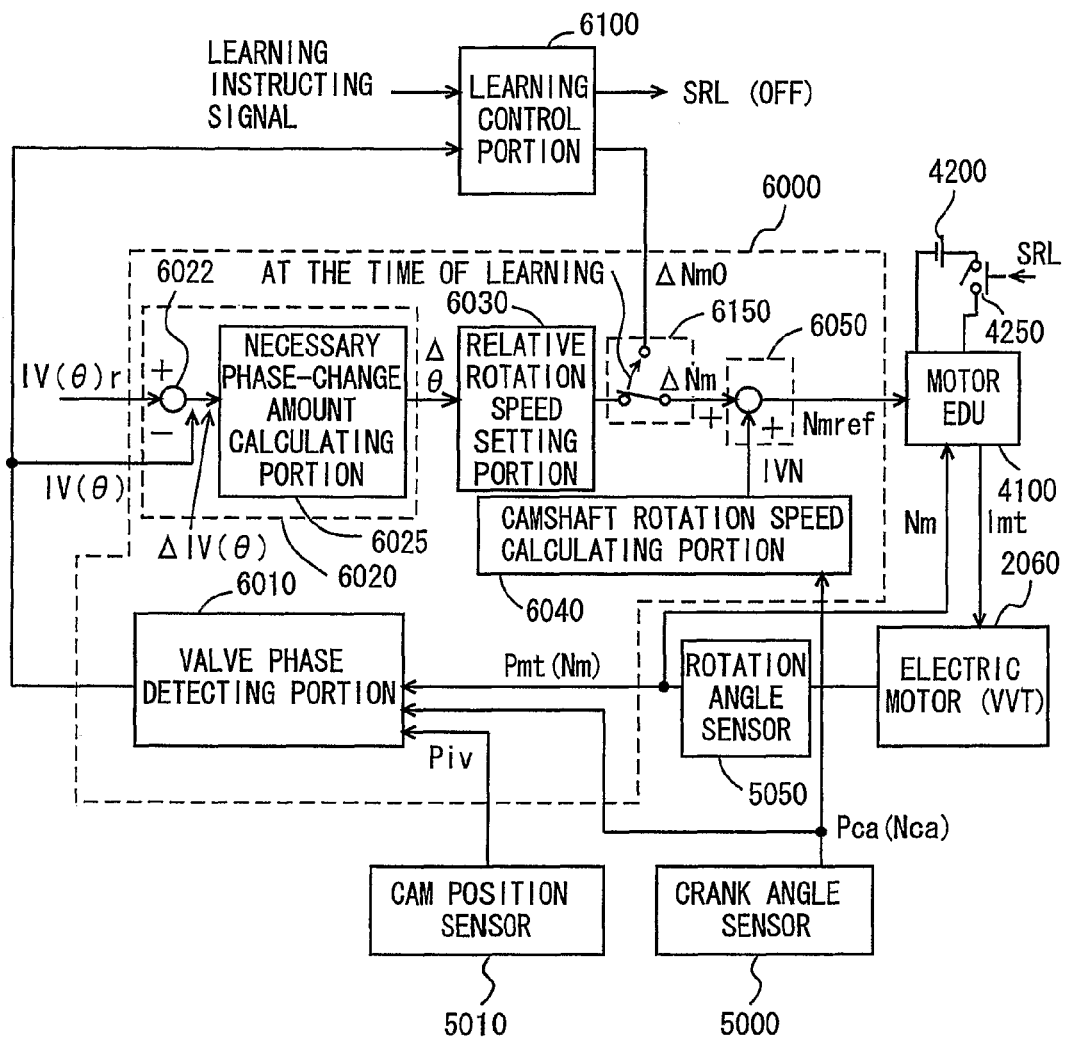
FIG. 12 is a block diagram illustrating rotation speed control of an electric motor as the actuator of the variable valve timing apparatus in accordance with the present embodiment.

FIG. 12 is a block diagram illustrating rotation speed control of electric motor 2060 as the actuator of intake VVT mechanism 2000 in accordance with the present embodiment.

Referring to FIG. 12, an actuator operation amount setting portion 6000 includes a valve phase detecting portion 6010, a camshaft phase-change amount calculating portion 6020, a relative rotation speed setting portion 6030, a camshaft rotation speed detecting portion 6040, a rotation speed command value generating portion 6050, and a switching portion 6150. Actuator operation amount setting portion 6000 executes valve timing control by which the phase of intake valve 1100 is changed following a target value IV($\theta$)r that is set successively in accordance with the map of FIG. 2.

Further, a learning control portion 6100 is provided, for learning the reference position of the intake valve phase. The operations of actuator operation amount setting portion 6000 and learning control portion 6100 are realized by executing a control process in accordance with a prescribed program stored in advance in ECU 4000 at every prescribed control period.

Valve phase detecting portion 6010 calculates the currently detected intake valve phase IV($\theta$) (hereinafter also denoted as phase detection value IV($\theta$)), based on crank angle signal Pca from crank angle sensor 5000, cam angle signal Piv from cam position sensor 5010 and motor rotation angle signal Pmt from rotation angle sensor 5050 of electric motor 2060.

Valve phase detecting portion 6010 may calculate the phase detection value IV($\theta$) based on crank angle signal Pca and on cam angle signal Piv. By way of example, at the time when cam angle signal Piv is generated, time difference of cam angle signal Piv from the generation of crank angle signal Pca is converted to rotation phase difference between crankshaft 1090 and intake camshaft 1120, whereby the current phase detection value IV($\theta$) of intake camshaft 1120 may be calculated (first phase calculating method).

Alternatively, in intake VVT mechanism 2000 in accordance with an embodiment of the present invention, it is possible to accurately trace the phase-change amount of intake valve based on the operation amount (relative rotation speed $\Delta$Nm) of electric motor 2060 as the actuator. Specifically, based on the outputs of various sensors, the actual relative rotation speed $\Delta$Nm is calculated, and by an operation in accordance with expression (1) described later based on the calculated actual relative rotation speed $\Delta$Nm, the amount of change dIV($\theta$) of the intake valve phase per unit time (control period) can be calculated. Therefore, by accumulating the amount of phase-change dIV($\theta$), valve phase detecting portion 6010 may calculate the current phase detection value IV($\theta$) of intake camshaft 1120 successively (second phase calculating method). Valve phase detecting portion 6010 may calculate the phase detection value IV($\theta$) by appropriately using the first and second phase calculating methods, in consideration of stability in engine speed or computational load.

Camshaft phase-change amount calculating portion 6020 has a calculating portion 6022 and a necessary phase-change amount calculating portion 6025. Calculating portion 6022 calculates deviation $\Delta$IV($\theta$) in phase, ($\Delta$IV($\theta$)=IV($\theta$)−IV($\theta$)r), from the target phase IV($\theta$)r. Necessary phase-change amount calculating portion 6025 calculates the necessary amount of change $\Delta\theta$ of intake camshaft 1120 of this control period, in accordance with the deviation $\Delta$IV($\theta$) calculated by calculating portion 6022.

By way of example, the maximum value $\Delta\theta$max of phase-change amount $\Delta\theta$ in a single control period is set in advance, and necessary phase-change amount calculating portion 6025 determines the phase-change amount $\Delta\theta$ in accordance with the phase deviation $\Delta$IV($\theta$) within the range up to the maximum value $\Delta\theta$max. Here, the maximum value $\Delta\theta$max may be a prescribed fixed value, or it may be variably set by necessary phase-change amount calculating portion 6025 in accordance with the state of operation (rotation speed, amount of intake air and the like) of engine 1000 or the magnitude of phase deviation $\Delta$IV($\theta$).

Relative rotation speed setting portion 6030 calculates relative rotation speed $\Delta$Nm of the output shaft of electric motor 2060 relative to the rotation speed of sprocket 2010 (intake camshaft 1120), necessary to generate the phase-change amount $\Delta\theta$ calculated by necessary phase-change amount calculating portion 6025. By way of example, the relative rotation speed $\Delta$Nm is set to a positive value ($\Delta$Nm>0) when the intake valve phase is to be advanced, set to a negative value ($\Delta$Nm<0) when the intake valve phase is to be retarded, and set to approximately zero ($\Delta$Nm=0) when the current intake valve phase is to be maintained ($\Delta\theta$=0).

Here, the relation between the phase-change amount $\Delta\theta$ per unit time $\Delta$T corresponding to the control period and the relative rotation speed $\Delta$Nm is represented by the following expression (1). In expression (1), R($\theta$) represents reduction gear ratio that changes in accordance with the intake valve phase, shown in FIG. 9.

$$\Delta\theta \propto \Delta Nm \cdot 360° \cdot (1/R(\theta)) \cdot \Delta T \quad (1)$$

Therefore, relative rotation speed setting portion 6030 may calculate the relative rotation speed $\Delta$Nm of electric motor 2060 for generating the camshaft phase-change amount Δθ required in control period ΔT, in accordance with an operation of expression (1).

Camshaft rotation speed detecting portion 6040 calculates the rotation speed of sprocket 2010, that is, the actual rotation speed IVN of intake camshaft 1120 as one-half the rotation speed of crankshaft 1090. Camshaft rotation speed detecting portion 6040 may be configured to calculate the actual rotation speed IVN of intake camshaft 1120 based on the cam angle signal Piv from cam position sensor 5010. Generally, however, the number of cam angle signals output per one rotation of intake camshaft 1120 is smaller than the number of crank angle signals output per one rotation of crankshaft 1090. Therefore, by detecting the camshaft rotation speed IVN based on the rotation speed of crankshaft 1090, detection accuracy can be improved.

Switching portion 6150 is arranged between rotation speed command value generating portion 6050 and relative rotation speed setting portion 6030 and learning control portion 6100. Switching portion 6150 inputs the relative rotation speed ΔNm set by relative rotation speed setting portion 6030 to rotation speed command value generating portion 6050 except when the reference position learning by learning control portion 6100 is being executed. The reference position learning in accordance with the present embodiment will be described in detail later.

Rotation speed command value generating portion 6050 adds the actual rotation speed IVN of intake camshaft 1120 detected by camshaft rotation speed detecting portion 6040 and the relative rotation speed ΔNm input from switching portion 6150 to generate rotation speed command value Nmref of electric motor 2060. Therefore, during operations including the normal operation, other than at the time of reference position learning, the rotation speed command value Nmref of electric motor 2060 is generated based on the relative rotation speed ΔNm set by relative rotation speed setting portion 6030. At the time of reference position learning, the rotation speed command value Nmref of electric motor 2060 is generated based on the relative rotation speed ΔNm0 set by learning control portion 6100. The rotation speed command value Nmref generated by rotation speed command value generating portion 6050 is transmitted to motor EDU 4100.

Motor EDU 4100 is connected to a power source 4200 through a relay circuit 4250. On/off of relay circuit 4250 is controlled by a control signal SRL. Generally, power source 4200 is formed by a secondary battery that can be charged when the engine operates. Therefore, by turning off the relay circuit, power supply to electric motor 2060 can be stopped.

Motor EDU 4100 executes rotation speed control such that the rotation speed of electric motor 2060 matches the rotation speed command value Nmref. By way of example, motor EDU 4100 controls switching of a power semiconductor device (such as a transistor) such that the power supplied to electric motor 2060 (as represented by motor current Imt) from a power source 4200 is controlled in accordance with deviation in rotation speed (Nref−Nm) of actual rotation speed Nm of electric motor 2060 from the rotation speed command value Nmref. Specifically, the duty ratio of switching operation of such power semiconductor device is controlled.

Particularly, in order to improve motor controllability, motor EDU 4100 controls duty ratio DTY as the amount of adjustment in rotation speed control in accordance with the following equation (2).

$$DTY = DTY(ST) + DTY(FB) \qquad (2)$$

In Equation (2), DTY(FB) is a feedback term based on the deviation in rotation speed mentioned above and a control operation (typically, general P control, PI control or the like) with a prescribed control gain.

In Equation (2), DTY(ST) is a preset term set based on the rotation speed command value Nmref of electric motor 2060 and the set relative rotation speed ΔNm.

Figure 13:
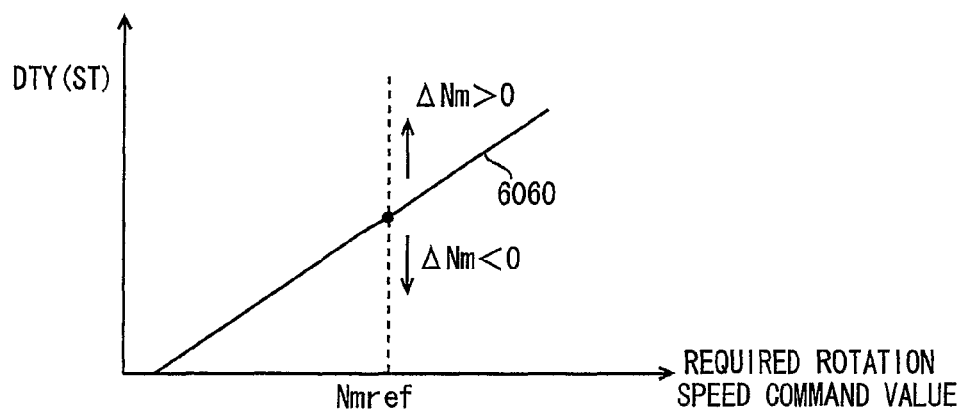
FIG. 13 illustrates speed control of the electric motor.

Referring to FIG. 13, duty ratio characteristic 6060 corresponding to the motor current value required when relative rotation speed ΔNm=0, that is, when electric motor 2060 is to be rotated at the same rotation speed as that of sprocket 2060 with respect to rotation speed command value Nmref (ΔNm=0), is set in advance as a table. Then, DTY(ST) in Equation (2) is set by relative addition/subtraction of a current value corresponding to the relative rotation speed ΔNm to/from the reference value in accordance with duty ratio characteristic 6060. By such rotation speed control that the power supply to electric motor 2060 is controlled by the combination of preset term and feedback term, motor EDU 4100 allows the rotation speed of electric motor 2060 to quickly follow any change in rotation speed command value Nmref, as compared with simple feedback control, that is, the rotation speed control simply by the term DTY(FB) of Equation (2).

(Reference Position Learning in Accordance With an Embodiment of the Present Invention)

In order to improve accuracy in detecting the phase of intake camshaft 1120, intake VVT mechanism 2000 performs reference position learning of the intake valve phase, using learning control portion 6100, when prescribed conditions instructing learning are satisfied. In the present embodiment of the invention, the reference position learning is done in a region where the reduction gear ratio R(θ) is large. Specifically, the reference position learning is done by causing the intake valve phase to reach the most retarded angle.

Referring to FIG. 12, learning control portion 6100 sets the relative rotation speed ΔNm0 of electric motor 2060 as the actuator operation amount for performing reference position learning, in response to a learning instructing signal that is turned "on" when prescribed conditions instructing learning are satisfied. At the time of reference position learning, switching portion 6150 inputs the output of learning control portion 6100 to rotation speed command value generating portion 6050, and therefore, based on the relative rotation speed ΔNm0 set by learning control portion 6100, the rotation speed command value Nmref of electric motor 2060 is generated.

During reference position learning in which electric motor 2060 operates in accordance with the relative rotation speed ΔNm0, learning control portion 6100 determines whether the intake valve phase has reached the most retarded angle (for example, 0°) as the reference phase, based on the phase detection value IV(θ) detected by valve phase detecting portion 6010.

When it is detected that the intake valve phase has reached the reference phase, learning control portion 6100 ends the learning operation, and sets the phase detection value IV(θ) at that time as phase learning value θ1n.

The phase learning value θ1n calculated in this manner is reflected on the detection of the intake valve phase in the valve timing control thereafter. By way of example, valve timing is controlled regarding the relative difference between the phase detecting value IV(θ) obtained by valve phase detecting portion 6010 and the phase learning value θ1n described above as the difference between the actual intake valve phase and the reference phase (that is, 0°) at the time of reference position learning. Specifically, the phase learning value θ1n is reflected on the calculation of phase deviation ΔIV(θ) at calculating portion 6022.

Figure 14:
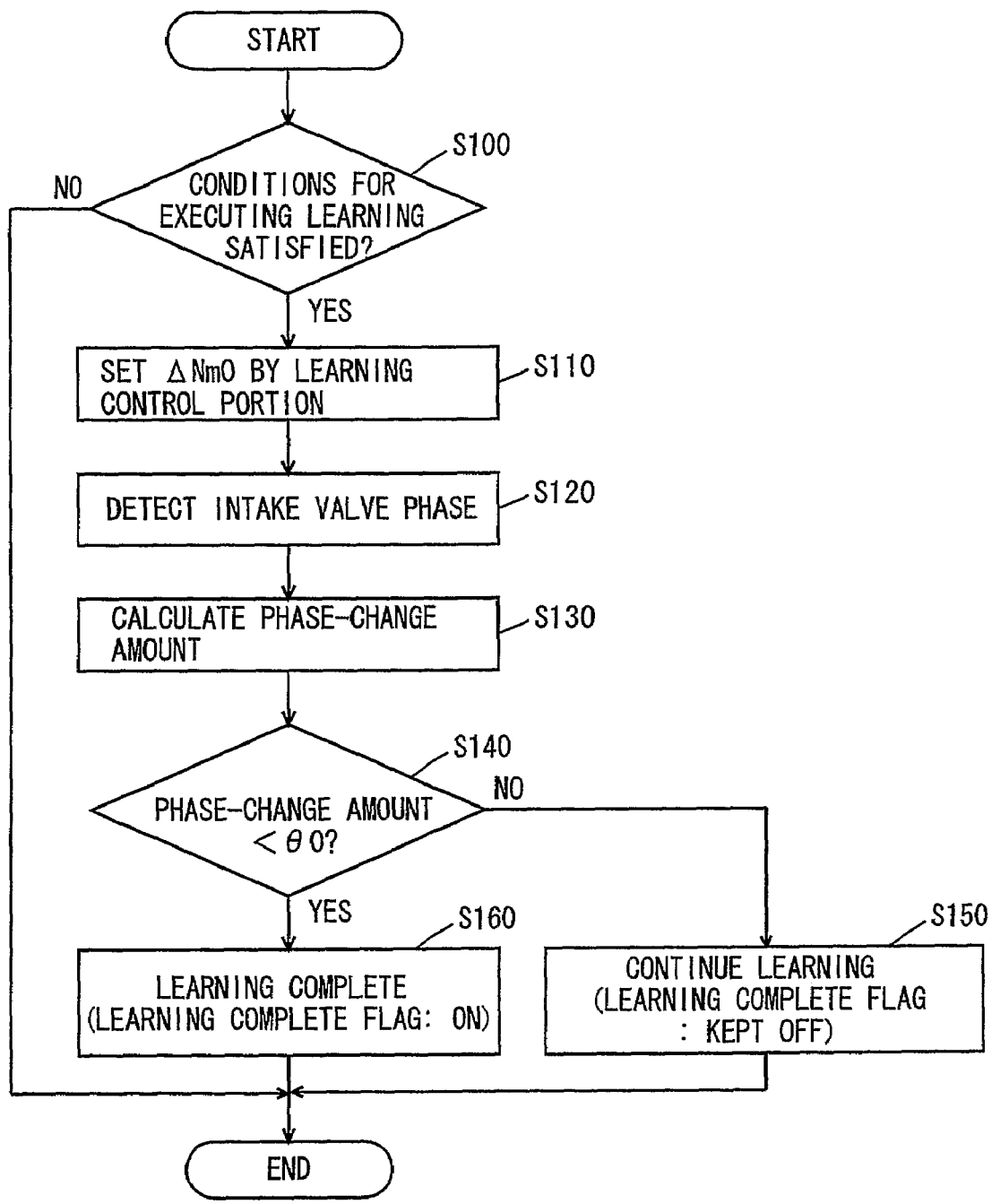
FIG. 14 is a flowchart representing the reference position learning in the variable valve timing apparatus in accordance with an embodiment of the present invention.

FIG. 14 shows a flowchart representing the reference position learning in accordance with the embodiment of the present invention, and FIG. 15 shows operation waveforms at the time of reference position learning. The reference position learning routine in accordance with the flowchart of FIG. 14 is executed at a prescribed period by ECU 4000.

Referring to FIG. 14, at step S100, ECU 4000 determines whether prescribed learning execution conditions are satisfied or not. As described with reference to FIG. 9, in intake VVT mechanism 2000 in accordance with the present embodiment, possibility of unintended phase change is low when power supply to electric motor 2060 as the actuator is stopped, because of the reduction gear ratio R(θ). Therefore, by storing the phase detection values IV(θ), which are successively detected in ECU 4000, in a memory area (such as an SRAM: Static Random Access Memory) that retains the stored contents even when the ignition switch is off (when the operation is stopped), it becomes unnecessary to perform the reference position learning every time the engine is started. When such an arrangement is adopted, the conditions for executing learning of step S100 may be satisfied when the contents stored in the memory are cleared, for example, at the time of battery change or the like.

Alternatively, in order to improve accuracy in detecting the intake valve phase, the conditions for executing learning of step S100 may be satisfied every time the engine is started.

When the conditions for executing learning are not satisfied (NO at step S100), ECU 4000 ends the process, as the reference position learning is not instructed.

On the other hand, when the conditions for executing learning are satisfied (YES at step S100), ECU 4000 turns "on" the learning instructing signal input to learning control portion 6100 (FIG. 12), and executes the reference position learning through the steps following step S110.

At step S110, ECU 4000 sets the relative rotation speed ΔNm0 of electric motor 2060, as the actuator operation amount for performing the reference position learning. The relative rotation speed ΔNm0 is set to a value for changing the intake valve phase to the most retarded angle (0°) as the reference phase. Specifically, in the present embodiment, the relative rotation speed ΔNm0 is set to a prescribed negative value. This corresponds to the operation of learning control portion 6100 in response to turning "on" of the learning instructing signal shown in FIG. 12.

Referring to FIG. 15, when the conditions for executing learning are satisfied and the learning instructing signal is turned "on" at time point t0, electric motor 2060 operates in accordance with relative rotation speed command value ΔNm0 (<0), whereby the phase detection value IV(θ) is retarded at a constant rate.

When the actual intake valve phase attains to the most retarded angle (0°) at time point t1, operation of link mechanism 2030 is locked, and the amount of change in intake valve phase becomes approximately zero. At this time, the relative rotation speed of electric motor 2060 also becomes approximately zero.

When there is an offset error in the phase detection value IV(θ), the actual intake valve phase reaches the most retarded angle before IV(θ)=0, and the relative rotation speed of electric motor 2060 attains to zero and the change in phase detection value IV(θ) stops. Therefore, whether the actual intake valve phase has reached the most retarded angle as the reference phase or not can be detected based on the amount of change in phase detecting value IV(θ), or on the amount of change dIV(θ) based on the actual relative rotation speed ΔNm, that is, the value dIV(θ) attaining to dIV(θ)≈0.

In response, the reference position learning is completed, and a learning complete flag is turned "on". The phase detection value IV(θ) at this time is stored as the phase learning value θ1n, and reflected on the valve timing control thereafter.

Again referring to FIG. 14, in order to realize the operation after time point t0 of FIG. 15, ECU 4000 executes following steps S120 to S160.

At step S120, ECU 4000 detects a change in intake valve phase by the operation of electric motor 2060 in accordance with relative rotation speed ΔNm0. This corresponds to calculation of phase detection value IV(θ) by valve phase detecting portion 6010.

Further, at step S130, ECU 4000 calculates the amount of phase-change based on the detection of intake valve phase at step S120. This is equivalent to calculation of phase-change amount dIV(θ), as described above.

At step S140, ECU 4000 compares the phase-change amount calculated at step S130 with a determination value θ0. The determination value θ0 is set to a prescribed value near zero, so as to enable detection that the phase-change amount reached approximately zero.

When the phase-change amount≧θ0 (NO at step S140), ECU 4000 determines that the actual intake valve phase is not yet reached the reference phase (most retarded angle), and at step S150, continues power supply to electric motor 2060, thereby to continue reference position learning. Specifically, between time points t0 and t1 of FIG. 15, step S150 is executed.

When the phase-change amount<θ0 (YES at step S140), ECU 4000 determines that the actual intake valve phase has reached the reference phase (most retarded angle), completes reference position learning, and obtains the phase learning value θ1n. Specifically, at time point t1 of FIG. 15, step S160 is executed.

Further, at the completion of reference position learning at which the amount of change in intake valve phase is approximately zero, it is in a locked state, and therefore, increase in motor current is expected. Therefore, when the timing at which the motor current increases overlaps among banks at the end of learning, power load increases instantaneously. Therefore, it is preferred that the reference position learning is performed with the timing of completion of the reference position learning (time point t1 of FIG. 15) shifted among the plurality of banks. By way of example, the increase in power load mentioned above can be avoided by shifting the timing of starting reference position learning (time point t0 of FIG. 15) among the plurality of banks.

Figure 16:
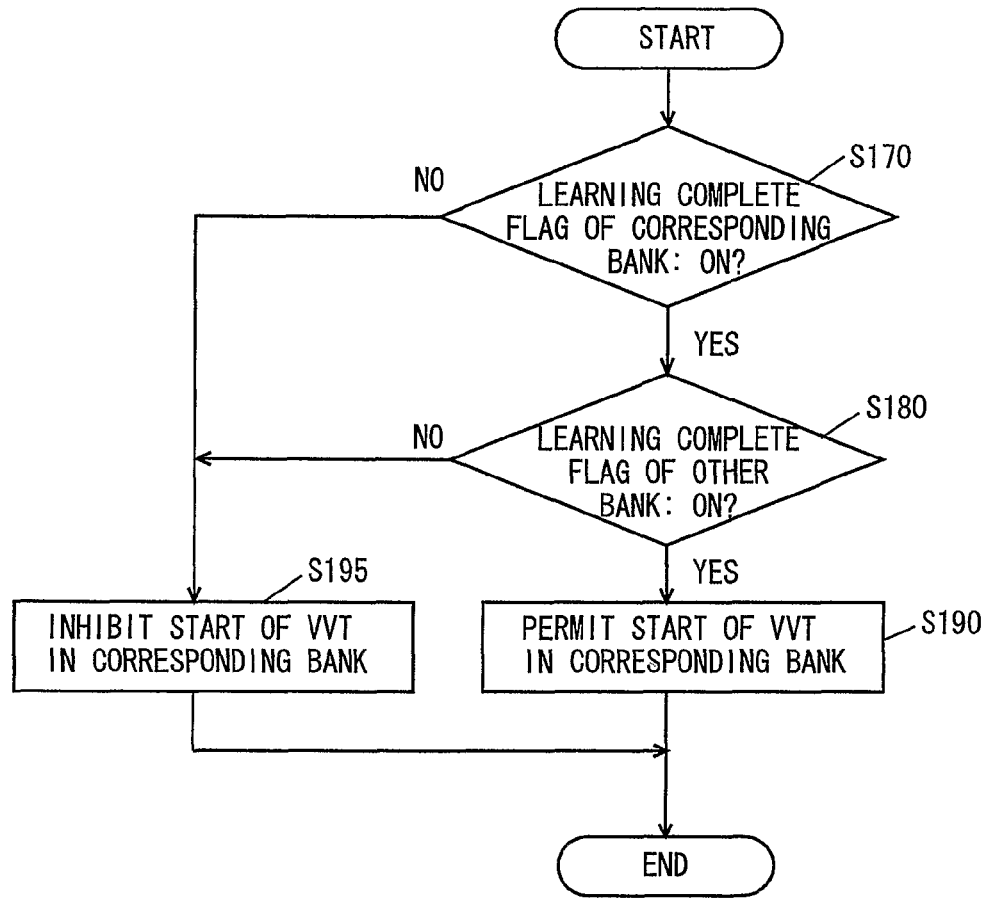
FIG. 16 is a flowchart representing determination as to whether the valve timing control may be started or not, in the variable valve timing apparatus in accordance with an embodiment of the present invention.

In the variable valve timing apparatus in accordance with the present embodiment, in an engine configured with a plurality of banks, a determination as to whether the valve timing control may be started or not such as shown in FIG. 16 is executed, in order to prevent variation in engine speed caused by deviation in valve timing setting among the banks.

Referring to FIG. 16, at the end of reference position learning, ECU 4000 determines whether the valve timing control may be started or not in each bank, through steps S170 to S195 as described in the following.

At step S170, ECU 4000 confirms whether the learning completion flag is "on" and the learning has been completed, in the corresponding bank. Further, when the learning has been completed in the corresponding bank (YES at step S170), at step S180, ECU 4000 confirms whether the learning completion flag is "on" and the learning has been completed in other banks.

When the reference position learning has been completed in the corresponding and other banks, that is, when the reference position learning has been completed in all banks (YES at both steps S170 and S180), at step S190, ECU 4000 permits intake VVT mechanism 2000 of the corresponding bank to start valve timing control. As a result, by the valve timing control reflecting the result of reference position learning, the phase of intake valve 1100 is changed following the target value IV(θ)r successively set in accordance with the map of FIG. 2.

When it is NO either at step S170 or S180, that is, when the reference position learning is completed in any of the banks, at step S195, ECU 4000 inhibits start of the valve timing control by intake VVT mechanism 2000 of the corresponding bank. Specifically, until it is confirmed that the reference position learning is completed in every bank, start of valve timing control is limited in each bank, even if the reference position learning has been completed in that bank.

Because of such a configuration, in the variable valve timing apparatus in accordance with the present embodiment, it becomes possible to have valve timing settings matched among the plurality of banks, to prevent variation in the amount of air introduced to the cylinders, among the banks. Thus, fluctuation of engine speed or the like can be prevented and satisfactory combustion characteristics of the engine can be maintained.

Particularly when the reference position learning is performed with the timing of completion of the reference position learning (time point t1 of FIG. 15) intentionally shifted among the plurality of banks, it is advantageous to have the valve timing setting matched among the plurality of banks at the time of timing control, through the determination as to whether the valve control may be started or not, as shown in FIG. 16.

Figure 17:
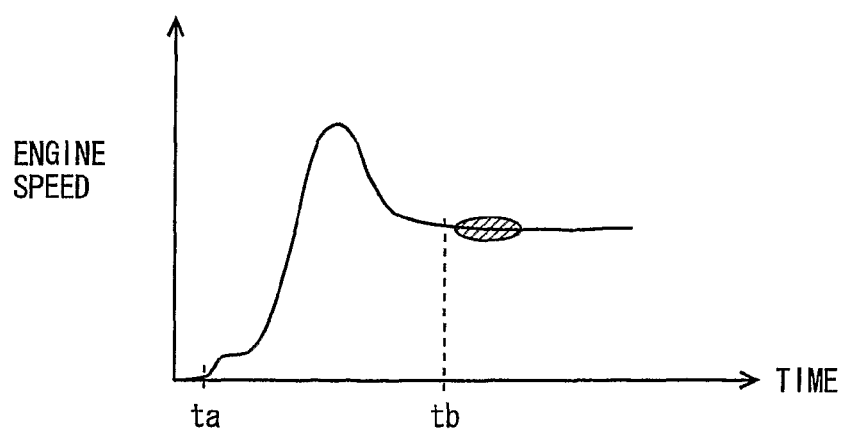
FIG. 17 is a diagram of waveforms representing the timing of executing the reference position learning corresponding to the engine start.

When the reference position learning is executed every time the engine starts, it is preferred to start reference position learning as soon as possible after time point tb, when the engine speed is once settled after the engine speed has increased by full combustion of the engine after the start at time point ta, as shown in FIG. 17.

At the time of reference position learning, however, the intake valve phase is set uniformly without considering combustion characteristics of the engine. Therefore, when the reference position learning is executed during an idle operation, combustion characteristics of the engine tend to deteriorate, possibly resulting in an engine stall in the worst case.

Further, generally, in the idle operation, idle speed control (ISC) is performed for adjusting the amount of air introduced to the cylinder, in order to maintain the engine speed at a prescribed idle speed. In the idle speed control, the basic amount of air, which is necessary to maintain the target idle speed (in hot condition) in a stable state of operation with the engine being hot, is corrected (increased or decreased) reflecting the difference in conditions between the stable state of operation and the present state (such as engine temperature and operation state of accessories). Typically, the amount of air to be introduced under the idle speed control is adjusted by controlling open position of throttle valve 1030.

Figure 18:
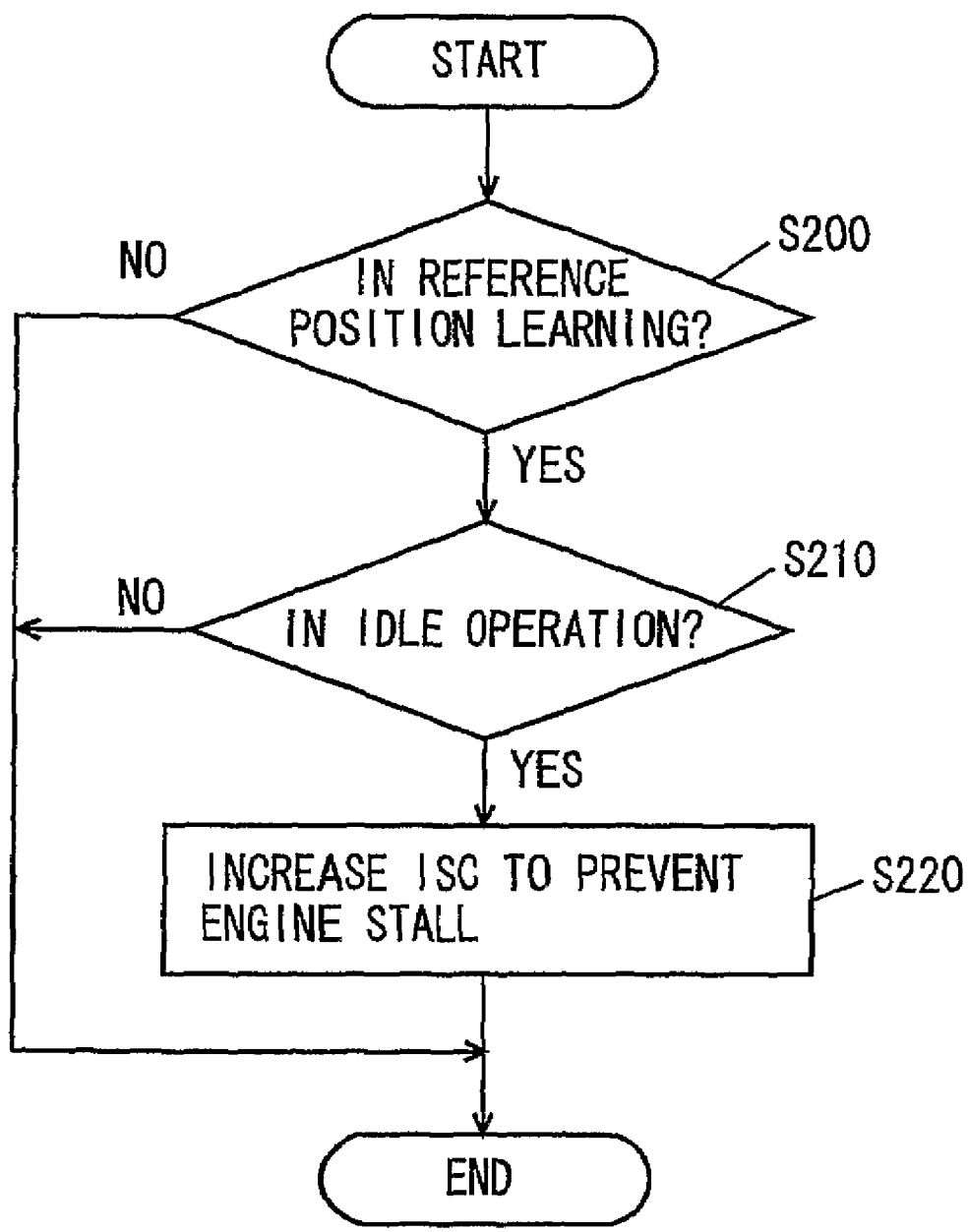
FIG. 18 is a flowchart representing the manner when the reference position learning is executed during an idle operation.

In the present embodiment, when the reference position learning is executed during the idle operation, deterioration of combustion characteristics is prevented by the control structure in accordance with the flowchart shown in FIG. 18.

Referring to FIG. 18, at step S200, ECU 4000 confirms whether the reference position learning is being executed or not, and at step S210, confirms whether the engine is in the idle operation or not.

When the reference position learning is executed during the idle operation (YES at both steps S200 and S210), ECU 4000 increases, at step S220, the amount of introduced air under idle speed control, so as to prevent an engine stall. Specifically, when the reference position learning is executed, the idle speed control is done with the amount of introduced air increased than when the reference position learning is not executed, assuming that other conditions are the same.

As a result, deterioration of combustion characteristics leading to an engine stall can be prevented when the reference position learning is executed during an idle operation of the engine.

In the variable valve timing apparatus in accordance with the present embodiment, the reference position may not be the most retarded angle, when a mechanism such as a lock pin is provided for mechanically limiting the change in the intake valve phase at the reference phase at the time of reference position learning. It is possible, however, by setting the reference phase in the reference position learning at the phase corresponding to the limit position of variable range of intake valve phase (most retarded angle/most advanced angle) as in the present embodiment, to execute the reference position learning without adding any special mechanism such as the lock pin.

In the embodiment described above, learning control portion 6100 of FIG. 12 or steps S110 to S160 of FIG. 14 correspond to the "reference position learning means (step)" of the present invention, steps S160 and S170 of FIG. 16 correspond to the "learning completion confirming means (step)" of the present invention, and step S195 corresponds to the "control start limiting means (step)" of the present invention. Further, step S220 of FIG. 18 corresponds to the "increasing means (step)" of the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A variable valve timing apparatus provided in an engine having a plurality of cylinder groups, said variable valve timing apparatus comprising:
   a changing mechanism provided corresponding to each of said plurality of cylinder groups, each for changing a timing of opening/closing at least one of an intake valve and an exhaust valve in the corresponding cylinder group;
   reference position learning means provided corresponding to each said changing mechanism, for generating an operation command to an actuator of corresponding said changing mechanism so that said opening/closing timing is changed to a prescribed timing when reference position learning is instructed, and when said opening/closing timing reaches said prescribed timing, for learning a reference of said opening/closing timing in response;
   learning completion confirming means for confirming whether said reference position learning by said reference position learning means has been completed in every said changing mechanism or not; and
   control start limiting means for inhibiting, in each said changing mechanism, start of opening/closing timing control for changing said opening/closing timing following a successively set target value, until it is confirmed by said learning completion confirming means that said reference position learning has been completed in all said changing mechanisms.

2. The variable valve timing apparatus according to claim 1, wherein each said changing mechanism is configured to change said opening/closing timing by an amount of change in accordance with an operation amount of said actuator, and further configured such that the change in said opening/closing timing is mechanically limited at said prescribed timing, at least during said reference position learning; and said reference position learning means generates an operation command of said actuator in each said changing mechanism so that the timing at which the opening/closing timing reaches said prescribed timing differs from one said changing mechanism to another, when said reference position learning is instructed.

3. The variable valve timing apparatus according to claim 1, further comprising increasing means for increasing, when said reference position learning is executed while said engine is in an idle operation, an amount of air introduced to said engine to be larger than when said reference position learning is not executed under the same conditions.

4. The variable valve timing apparatus according to claim 1, wherein in each said changing mechanism, said prescribed timing is provided corresponding to a mechanical limit of a variable range of said opening/closing timing.

5. The variable valve timing apparatus according to claim 1, wherein said actuator is implemented by an electric motor, and said changing mechanism is configured to change said opening/closing timing by an amount of change corresponding to a difference in rotation speed of said electric motor relative to the rotation speed of a camshaft driving the valve of which opening/closing timing is to be changed.

6. A variable valve timing apparatus provided in an engine having a plurality of cylinder groups, said variable valve timing apparatus comprising:

a changing mechanism provided corresponding to each of said plurality of cylinder groups, each for changing a timing of opening/closing at least one of an intake valve and an exhaust valve in the corresponding cylinder group; and a control unit for controlling an operation of each said changing mechanism;

wherein said control unit is configured to execute reference position learning independently in each said changing mechanism, to generate an operation command to an actuator of corresponding said changing mechanism so that said opening/closing timing is changed to a prescribed timing when said reference position learning is instructed, and when said opening/closing timing reaches said prescribed timing, to learn a reference of said opening/closing timing in response, and said control unit is further configured to confirm whether said reference position learning has been completed in every said changing mechanism or not, and to inhibit, in each said changing mechanism, start of opening/closing timing control for changing said opening/closing timing following a successively set target value, until it is confirmed that said reference position learning has been completed in all said changing mechanisms.

7. The variable valve timing apparatus according to claim 6, wherein each said changing mechanism is configured to change said opening/closing timing by an amount of change in accordance with an operation amount of said actuator, and further configured such that the change in said opening/closing timing is mechanically limited at said prescribed timing, at least during said reference position learning; and said control unit generates an operation command of said actuator in each said changing mechanism so that the timing at which the opening/closing timing reaches said prescribed timing differs from one said changing mechanism to another, when said reference position learning is instructed.

8. The variable valve timing apparatus according to claim 6, wherein said control unit further generates a control command to increase, when said reference position learning is executed while said engine is in an idle operation, an amount of air introduced to said engine to be larger than when said reference position learning is not executed under the same conditions.

9. A method of controlling a variable valve timing apparatus having, for each cylinder group, a changing mechanism for changing a timing of opening/closing at least one of an intake valve and an exhaust valve provided in an engine, the method comprising:

a reference position learning step, executed for each said changing mechanism, of generating an operation command to an actuator of corresponding said changing mechanism so that said opening/closing timing is changed to a prescribed timing when reference position learning is instructed, and when said opening/closing timing reaches said prescribed timing, and learning a reference of said opening/closing timing in response;

a learning completion confirming step of confirming whether said reference position learning has been completed at said reference position learning step, in every said changing mechanism; and a control start limiting step of inhibiting, in each said changing mechanism, start of opening/closing timing control for changing said opening/closing timing following a successively set target value, until it is confirmed at said learning completion confirming step that said reference position learning has been completed in all said changing mechanisms.

10. The method of controlling a variable valve timing apparatus according to claim 9, wherein each said changing mechanism is configured to change said opening/closing timing by an amount of change in accordance with an operation amount of said actuator, and further configured such that the change in said opening/closing timing is mechanically limited at said prescribed timing, at least during said reference position learning; and at said reference position learning step, an operation command of said actuator in each said changing mechanism is generated so that the timing at which the opening/closing timing reaches said prescribed timing differs from one said changing mechanism to another, when said reference position learning is instructed.

11. The method of controlling a variable valve timing apparatus according to claim 9, further comprising an increasing step of increasing, when said reference position learning is executed while said engine is in an idle operation, an amount of air introduced to said engine to be larger than when said reference position learning is not executed under the same conditions.

12. The method of controlling a variable valve timing apparatus according to claim 9, wherein in each said changing mechanism, said prescribed timing is provided corresponding to a mechanical limit of a variable range of said opening/closing timing.

13. The method of controlling a variable valve timing apparatus according to claim 9, wherein said actuator is implemented by an electric motor, and said changing mechanism is configured to change said opening/closing timing by an amount of change corresponding to a difference in rotation speed of said electric motor relative to the rotation speed of a camshaft driving the valve of which opening/closing timing is to be changed.

* * * * *